(12) United States Patent
Sukhadia et al.

(10) Patent No.: US 10,113,016 B2
(45) Date of Patent: Oct. 30, 2018

(54) LOW DENSITY POLYOLEFIN RESINS WITH LOW MOLECULAR WEIGHT AND HIGH MOLECULAR WEIGHT COMPONENTS, AND FILMS MADE THEREFROM

(71) Applicant: Chevron Phillips Chemical Company LP, The Woodlands, TX (US)

(72) Inventors: Ashish M. Sukhadia, Bartlesville, OK (US); Max P. McDaniel, Bartlesville, OK (US); Errun Ding, Bartlesville, OK (US); Guylaine St. Jean, North Olmsted, OH (US); Qing Yang, Bartlesville, OK (US); Daniel G. Hert, Owasso, OK (US); Chung Ching Tso, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/428,183

(22) Filed: Feb. 9, 2017

(65) Prior Publication Data

US 2017/0145123 A1    May 25, 2017

Related U.S. Application Data

(62) Division of application No. 14/876,890, filed on Oct. 7, 2015, which is a division of application No. 14/072,819, filed on Nov. 6, 2013, now Pat. No. 9,181,370.

(51) Int. Cl.

| | |
|---|---|
| *C08F 10/02* | (2006.01) |
| *C08F 210/16* | (2006.01) |
| *C08J 5/18* | (2006.01) |
| *C08L 23/08* | (2006.01) |
| *C08F 210/02* | (2006.01) |
| *C08F 210/08* | (2006.01) |
| *C08F 210/14* | (2006.01) |
| *C08F 4/659* | (2006.01) |
| *C08F 4/6592* | (2006.01) |

(52) U.S. Cl.
CPC ............ *C08F 10/02* (2013.01); *C08F 210/02* (2013.01); *C08F 210/08* (2013.01); *C08F 210/14* (2013.01); *C08F 210/16* (2013.01); *C08J 5/18* (2013.01); *C08L 23/0815* (2013.01); *C08F 4/65904* (2013.01); *C08F 4/65912* (2013.01); *C08F 4/65916* (2013.01); *C08F 4/65927* (2013.01); *C08F 2410/02* (2013.01); *C08F 2420/01* (2013.01); *C08J 2323/08* (2013.01); *H05K 999/99* (2013.01)

(58) Field of Classification Search
CPC .............. C08F 4/65904; C08F 4/65916; C08F 210/00; C08F 210/16; C08F 4/65927; C08L 23/0815

See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood |
| 4,060,480 A | 11/1977 | Reed |
| 4,452,910 A | 6/1984 | Hopkins |
| 4,501,885 A | 2/1985 | Sherk et al. |
| 4,588,790 A | 5/1986 | Jenking, III et al. |
| 4,794,096 A | 12/1988 | Ewen |
| 4,808,561 A | 2/1989 | Welborn |
| 5,352,749 A | 10/1994 | DeChellis et al. |
| 5,376,611 A | 12/1994 | Shveima |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa |
| 5,739,220 A | 4/1998 | Shamshoum et al. |
| 5,807,938 A | 9/1998 | Kaneko |
| 5,919,983 A | 7/1999 | Rosen |
| 6,107,230 A | 8/2000 | McDaniel et al. |
| 6,165,929 A | 12/2000 | McDaniel et al. |
| 6,239,235 B1 | 5/2001 | Hottovy et al. |
| 6,262,191 B1 | 7/2001 | Hottovy et al. |
| 6,294,494 B1 | 9/2001 | McDaniel et al. |
| 6,300,271 B1 | 10/2001 | McDaniel et al. |
| 6,316,553 B1 | 11/2001 | McDaniel et al. |
| 6,355,594 B1 | 3/2002 | McDaniel et al. |
| 6,376,415 B1 | 4/2002 | McDaniel et al. |
| 6,388,017 B1 | 5/2002 | McDaniel et al. |
| 6,391,816 B1 | 5/2002 | McDaniel et al. |
| 6,395,666 B1 | 5/2002 | McDaniel et al. |
| 6,524,987 B1 | 2/2003 | Collins et al. |
| 6,548,441 B1 | 4/2003 | McDaniel et al. |

(Continued)

OTHER PUBLICATIONS

Arnett, entitled "*Zero-Shear Viscosity of Some Ethyl Branched Paraffinic Model Polymers*," J. Phys. Chem., 1980, vol. 84, pp. 649-652.

Bird et al., entitled "*Dynamics of Polymeric Liquids*," John Wiley & Sons, Fluid Mechanics, 2$^{nd}$ Edition, 1987, vol. 1, pp. 170-172.

*Film Extrusion Manual—Process, Materials, Properties*, TAPPI Press, 1992, 16 pages.

Hieber et al., entitled "*Some Correlations Involving the Shear Viscosity of Polystyrene Melts*," Rheol. Acta, 28, 1989, pp. 321-332.

Hieber et al., entitled "*Shear-Rate-Dependence Modeling of Polymer Melt Viscosity*," Polymer Engineering and Science, 1992, vol. 32, No. 14, pp. 931-938.

(Continued)

*Primary Examiner* — Caixia Lu

(74) *Attorney, Agent, or Firm* — Merchant & Gould, P.C.

(57) ABSTRACT

Disclosed herein are ethylene-based polymers produced using dual metallocene catalyst systems. These polymers have low densities, high molecular weights, and broad molecular weight distributions, as well as having the majority of the long chain branches in the lower molecular weight component of the polymer, and the majority of the short chain branches in the higher molecular weight component of the polymer. Films produced from these polymers have improved impact and puncture resistance.

21 Claims, 8 Drawing Sheets

(56) References Cited

U.S. PATENT DOCUMENTS

| | | | |
|---|---|---|---|
| 6,548,442 | B1 | 4/2003 | McDaniel et al. |
| 6,576,583 | B1 | 6/2003 | McDaniel et al. |
| 6,613,712 | B1 | 9/2003 | McDaniel et al. |
| 6,632,894 | B1 | 10/2003 | McDaniel et al. |
| 6,667,274 | B1 | 12/2003 | Hawley et al. |
| 6,750,302 | B1 | 6/2004 | McDaniel et al. |
| 6,833,415 | B2 | 12/2004 | Kendrick et al. |
| 7,026,494 | B1 | 4/2006 | Yang et al. |
| 7,041,617 | B2 | 5/2006 | Jensen et al. |
| 7,119,153 | B2 | 10/2006 | Jensen et al. |
| 7,226,886 | B2 | 6/2007 | Jayaratne et al. |
| 7,294,599 | B2 | 11/2007 | Jensen et al. |
| 7,300,983 | B2 | 11/2007 | Degroot et al. |
| 7,312,283 | B2 | 12/2007 | Martin et al. |
| 7,517,939 | B2 | 4/2009 | Yang et al. |
| 7,601,665 | B2 | 10/2009 | McDaniel et al. |
| 7,619,047 | B2 | 11/2009 | Yang et al. |
| 7,632,907 | B2 | 12/2009 | Sukhadia et al. |
| 7,652,160 | B2 | 1/2010 | Yang et al. |
| 7,732,542 | B2 | 6/2010 | Yang et al. |
| 7,829,646 | B2 | 11/2010 | DesLauriers et al. |
| 7,884,163 | B2 | 2/2011 | McDaniel et al. |
| 7,884,165 | B2 | 2/2011 | McDaniel et al. |
| 7,960,487 | B2 | 6/2011 | Yang et al. |
| 8,110,640 | B2 | 2/2012 | McDaniel et al. |
| 8,114,946 | B2 | 2/2012 | Yang et al. |
| 8,138,113 | B2 | 3/2012 | Yang et al. |
| 8,153,043 | B2 | 4/2012 | Krishnaswamy et al. |
| 8,153,734 | B2 | 4/2012 | Michel et al. |
| 8,207,280 | B2 | 6/2012 | Murray et al. |
| 8,242,221 | B2 | 8/2012 | McDaniel et al. |
| 8,268,944 | B2 | 9/2012 | Yang et al. |
| 8,288,487 | B2 | 10/2012 | Yang et al. |
| 8,309,485 | B2 | 11/2012 | Yang et al. |
| 8,309,748 | B2 | 11/2012 | Ding et al. |
| 8,476,394 | B2 | 7/2013 | St. Jean et al. |
| 9,006,367 | B2 | 4/2015 | McDaniel et al. |
| 9,156,970 | B2 | 10/2015 | Hlavinka et al. |
| 9,181,370 | B2 | 11/2015 | Sukhadia et al. |
| 9,334,350 | B2 | 5/2016 | McDaniel et al. |
| 9,605,097 | B2 | 3/2017 | Sukhadia et al. |
| 2004/0059070 | A1 | 3/2004 | Whitte et al. |
| 2005/0159300 | A1 | 7/2005 | Jensen et al. |
| 2007/0043176 | A1 | 2/2007 | Martin et al. |
| 2007/0043182 | A1 | 2/2007 | Martin et al. |
| 2009/0137755 | A1 | 5/2009 | Yamada et al. |
| 2010/0076167 | A1 | 3/2010 | McDaniel et al. |
| 2010/0331505 | A1 | 12/2010 | Masino et al. |
| 2012/0271016 | A1 | 10/2012 | O'Hare et al. |
| 2012/0329641 | A1 | 12/2012 | Yang et al. |
| 2013/0085060 | A1 | 4/2013 | Ding et al. |
| 2014/0088274 | A1 | 3/2014 | Ding et al. |
| 2014/0128563 | A1 | 5/2014 | McDaniel et al. |
| 2014/0163181 | A1 | 6/2014 | Yang et al. |
| 2015/0126692 | A1 | 5/2015 | Sukhadia et al. |

OTHER PUBLICATIONS

Janzen et al., entitled "Diagnosing Long-Chain Branching in Polyethylenes," Journal of Molecular Structure, 1999, pp. 485-486, 569-584.

Li et al., entitled "Coordination Copolymerization of Severely Encumbered Isoalkenes with Ethylene: Enhanced Enchainment Mediated by Binuclear Catalysts and Cocatalysts," JACS, 2005, 127, pp. 14756-14768.

Modern Plastics Encyclopedia, Mid-Nov. 1995 Issue, vol. 72, No. 12, 3 pages.

Pinnavaia, entitled "Intercalated Clay Catalysts," Science, 1983, 220(4595), pp. 365-371.

Thomas, entitled "Sheet Silicate Intercalates: New Agents for Unusual Chemical Conversions," Intercalation Chemistry, 1982, Ch. 3, pp. 55-99.

Wyatt, Philip J., entitled "Light Scattering and the Absolute Characterization of Macromolecules," Analytica Chimica Acta, 1993, 272, pp. 1-40.

Yu et al., entitled "Long Chain Branches in Metallocene-Catalyzed Polyethylene Determined by a Combination of SEC/Multi-Angle Lights Scattering, NMR and Rheology," Polymer Preprints, 2003, 44, pp. 49-50.

International Search Report and the Written Opinion of the International Searching Authority from International Application No. PCT/US2013/068785, dated Feb. 6, 2014, 9 pages.

International Application No. PCT/US2014/063857 Invitation to Pay Additional Fees (Partial International Search) dated Feb. 19, 2015; 2 pages.

LOW DENSITY POLYOLEFIN RESINS WITH LOW MOLECULAR WEIGHT AND HIGH MOLECULAR WEIGHT COMPONENTS, AND FILMS MADE THEREFROM

CROSS-REFERENCE TO RELATED APPLICATIONS

This application is a divisional application of co-pending U.S. patent application Ser. No. 14/876,890, filed on Oct. 7, 2015, now U.S. Pat. No. 9,605,097, which is a divisional application of U.S. patent application Ser. No. 14/072,819, filed on Nov. 6, 2013, now U.S. Pat. No. 9,181,370, the disclosures of which are incorporated herein by reference in their entirety.

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Medium or high density polymers with a high molecular weight and a broad molecular weight distribution often have a combination of relatively easy processing, superior melt strength, and a good balance of stiffness and physical properties. In some end-use applications, however, it can be beneficial to have this combination of properties, but also to have improved puncture, impact, and tear resistance. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to new catalyst compositions, methods for preparing catalyst compositions, methods for using the catalyst compositions to polymerize olefins, the polymer resins produced using such catalyst compositions, and articles produced using these polymer resins. In particular, embodiments of the present invention are directed to catalyst compositions employing two metallocene catalyst components. The first catalyst component generally can produce a lower molecular component having high amounts of long chain branches (e.g., a two carbon bridged metallocene compound containing two cyclopentadienyl groups, two indenyl groups, or a cyclopentadienyl and an indenyl group), while the second catalyst component generally can produce a higher molecular weight component having very few long chain branches (e.g., a single atom bridged metallocene compound containing a fluorenyl group). Typically, the weight percentage of the first catalyst component can be in a range from about 25 to about 98%, based on the total weight of the first and second catalyst components. Such catalyst compositions can be used to produce, for example, ethylene-based copolymers having the majority of the long chain branches in the lower molecular weights, and the majority of the short chain branches in the higher molecular weights.

The present invention also contemplates and encompasses olefin polymerization processes. Such processes can comprise contacting a catalyst composition with an olefin monomer and optionally an olefin comonomer under polymerization conditions to produce an olefin polymer. Generally, the catalyst composition employed can comprise any of the catalyst component I metallocene compounds, any of the catalyst component II metallocene compounds, and any of the activators and optional co-catalysts disclosed herein. For example, organoaluminum compounds can be utilized in the catalyst compositions and/or polymerization processes.

Polymers produced from the polymerization of olefins, resulting in homopolymers, copolymers, terpolymers, etc., can be used to produce various articles of manufacture. A representative and non-limiting example of an olefin polymer (e.g., an ethylene copolymer) consistent with embodiments of this invention can comprise a higher molecular weight component and a lower molecular weight component, and can be characterized as having the following properties: a ratio of the Mp of the higher molecular weight component to the Mp of the lower molecular weight component in a range from about 5:1 to about 100:1, a number of LCB of the lower molecular weight component in a range from about 5 to about 50 LCB per million total carbon atoms, and a number of LCB of the higher molecular weight component of less than or equal to about 5 LCB per million total carbon atoms. Another representative and non-limiting ethylene-based polymer described herein can have a lower molecular weight component having a Mp in a range from about 15 to about 80 kg/mol, and from about 5 to about 50 LCB per million total carbon atoms, and a higher molecular weight component having a Mp in a range from about 150 to about 800 kg/mol, and less than or equal to about 5 LCB per million total carbon atoms. Yet another representative and non-limiting ethylene-based polymer described herein can have a ratio of the Mp of the higher molecular weight component to the Mp of the lower molecular weight component in a range from about 5:1 to about 100:1, and a ratio of the number of LCB of the polymer to the number of LCB of the higher molecular weight component, per millions total carbon atoms, in a range from about 2:1 to about 100:1. And yet another representative and non-limiting ethylene-based polymer described herein can have a ratio of the Mp of the higher molecular weight component to the Mp of the lower molecular weight component in a range from about 5:1 to about 100:1, a number of LCB of the higher molecular weight component of less than or equal to about 5 LCB per million total carbon atoms, and a number of LCB of the olefin polymer in a range from about 2 to about 30 LCB per million total carbon atoms. Moreover, blown films comprising olefin polymers disclosed herein, for instance, having a melt index less than or equal to about 0.4 g/10 min, can have very high puncture/impact resistance properties, such as a dart impact strength greater than or equal to about 300 g/mil.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

Figure 1:
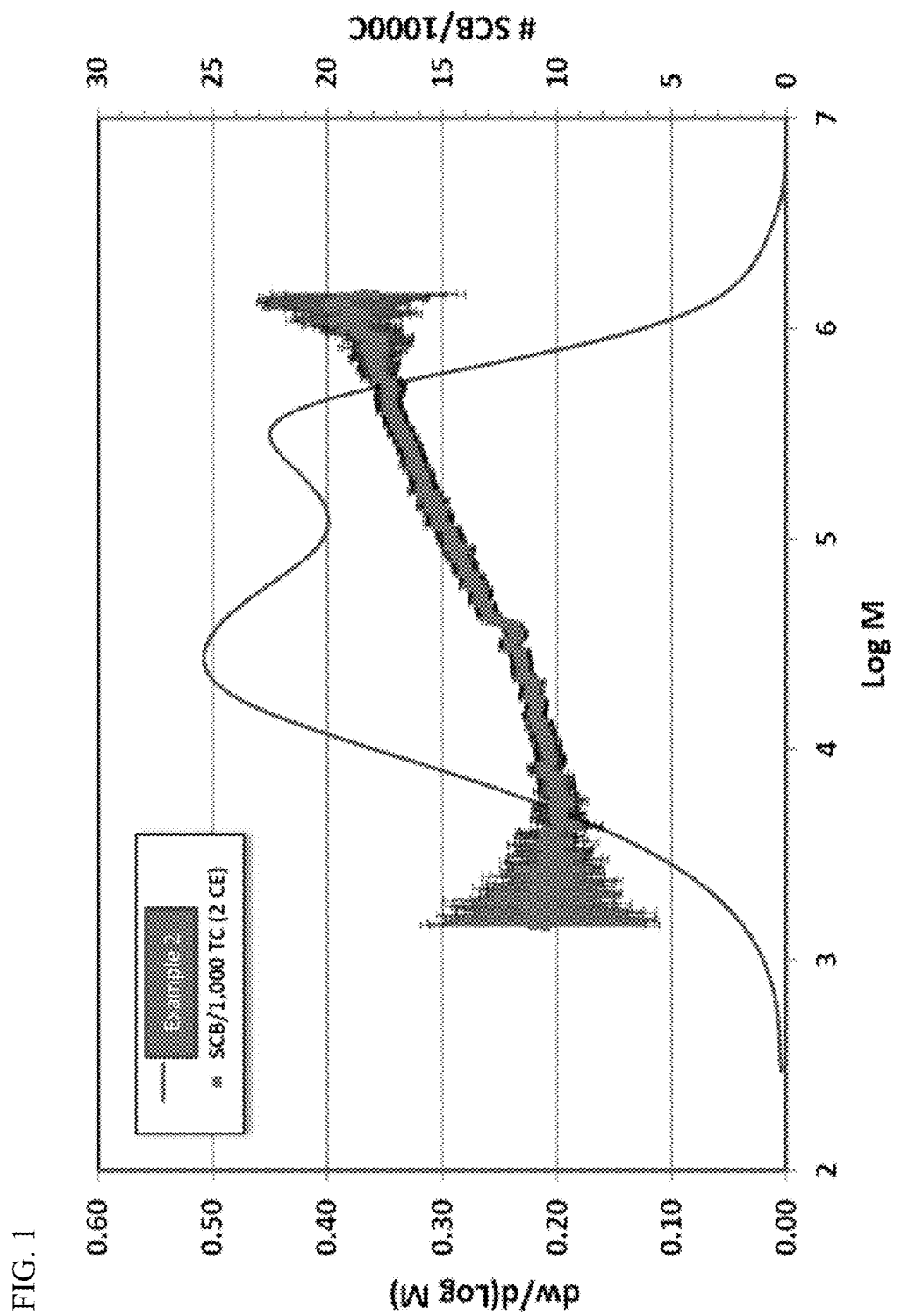
FIG. 1 presents a plot of the molecular weight distribution and short chain branch distribution of the polymer of Example 2.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with embodiments of the present invention can comprise; alternatively, can consist essentially of; or alternatively, can consist of; (i) catalyst component I, (ii) catalyst component II, (iii) an activator, and (iv) optionally, a co-catalyst.

The terms "a," "an," "the," etc., are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The terms "chemically-treated solid oxide," "treated solid oxide compound," and the like, are used herein to indicate a solid, inorganic oxide of relatively high porosity, which can exhibit Lewis acidic or Bronsted acidic behavior, and which has been treated with an electron-withdrawing component, typically an anion, and which is calcined. The electron-withdrawing component is typically an electron-withdrawing anion source compound. Thus, the chemically-treated solid oxide can comprise a calcined contact product of at least one solid oxide with at least one electron-withdrawing anion source compound. Typically, the chemically-treated solid oxide comprises at least one acidic solid oxide compound. The "activator-support" of the present invention can be a chemically-treated solid oxide. The terms "support" and "activator-support" are not used to imply these components are inert, and such components should not be construed as an inert component of the catalyst composition. The term "activator," as used herein, refers generally to a substance that is capable of converting a metallocene component into a catalyst that can polymerize olefins, or converting a contact product of a metallocene component and a component that provides an activatable ligand (e.g., an alkyl, a hydride) to the metallocene, when the metallocene compound does not already comprise such a ligand, into a catalyst that can polymerize olefins. This term is used regardless of the actual activating mechanism. Illustrative activators include activator-supports, aluminoxanes, organoboron or organoborate compounds, ionizing ionic compounds, and the like. Aluminoxanes, organoboron or organoborate compounds, and ionizing ionic compounds generally are referred to as activators if used in a catalyst composition in which an activator-support is not present. If the catalyst composition contains an activator-support, then the aluminoxane, organoboron or organoborate, and ionizing ionic materials are typically referred to as co-catalysts.

The term "metallocene" as used herein describes compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound(s), or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the number-average molecular weight (Mn) of an olefin polymer produced in an embodiment of this invention. By a disclosure that the Mn can be in a range from about 10 to about 50 kg/mol, Applicants intend to recite that the Mn can be any molecular weight in the range and, for example, can be equal to about 10, about 15, about 20, about 25, about 30, about 35, about 40, about 45, or about 50 kg/mol. Additionally, the Mn can be within any range from about 10 to about 50 (for example, from about 10 to about 25), and this also includes any combination of ranges between about 10 and about 50 (for example, the Mn can be in a range from about 10 to about 20, or from about 25 to about 45 kg/mol).

Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present invention is directed generally to new catalyst compositions, methods for preparing catalyst compositions, methods for using the catalyst compositions to polymerize olefins, the polymer resins produced using such catalyst compositions, and articles produced using these polymer resins. In particular, the present invention relates to catalyst compositions containing two metallocene components, to polymerization processes utilizing such catalyst compositions, and to the resulting olefin polymers produced from the polymerization processes.

Catalyst Component I

Catalyst component I generally can produce a lower molecular weight component having more long chain branches and less short chain branches than the higher molecular weight component. Suitable catalyst component I metallocene compounds generally can produce a lower molecular weight component of the polymer such that the ratio of the number of LCB of the lower molecular weight component to the number of LCB of the higher molecular weight component, per millions total carbon atoms, typically can be in a range from about 4:1 to about 100:1, or from about 5:1 to about 50:1, e.g., about 8:1, about 10:1, about 15:1, about 20:1, and so forth.

Catalyst component I can comprise a two carbon bridged metallocene compound containing two cyclopentadienyl groups, two indenyl groups, or a cyclopentadienyl and an indenyl group. In one embodiment, for instance, catalyst component I can comprise a two carbon bridged, zirconium based metallocene compound containing two cyclopentadienyl groups, two indenyl groups, or a cyclopentadienyl and an indenyl group. In another embodiment, catalyst component I can comprise a two carbon bridged, zirconium based metallocene compound containing two indenyl groups.

Catalyst component I can comprise, in particular embodiments of this invention, a two carbon bridged metallocene compound having formula (A):

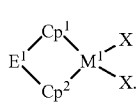

(A)

Within formula (A), $M^1$, $Cp^1$, $Cp^2$, $E^1$, and each X are independent elements of the two carbon bridged metallocene compound. Accordingly, the metallocene compound having formula (A) can be described using any combination of $M^1$, $Cp^1$, $Cp^2$, $E^1$, and X disclosed herein.

Unless otherwise specified, formula (A) above, any other structural formulas disclosed herein, and any metallocene complex, compound, or species disclosed herein are not designed to show stereochemistry or isomeric positioning of the different moieties (e.g., these formulas are not intended to display cis or trans isomers, or R or S diastereoisomers), although such compounds are contemplated and encompassed by these formulas and/or structures.

In accordance with embodiments of this invention, the metal in formula (A), $M^1$ can be Zr or Hf. In one embodiment, for instance, $M^1$ can be Zr, while in another embodiment, $M^1$ can be Hf.

Each X in formula (A) independently can be a monoanionic ligand. In some embodiments, suitable monoanionic ligands can include, but are not limited to, H (hydride), $BH_4$, a halide, a $C_1$ to $C_{36}$ hydrocarbyl group, a $C_1$ to $C_{36}$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, —$OBR_2^1$, or —$OSO_2R^1$, wherein $R^1$ is a $C_1$ to $C_{36}$ hydrocarbyl group. It is contemplated that each X can be either the same or a different monoanionic ligand.

In one embodiment, each X independently can be H, $BH_4$, a halide (e.g., F, Cl, Br, etc.), a $C_1$ to $C_{18}$ hydrocarbyl group, a $C_1$ to $C_{18}$ hydrocarboxy group, a $C_1$ to $C_{18}$ hydrocarbylaminyl group, a $C_1$ to $C_{18}$ hydrocarbylsilyl group, or a $C_1$ to $C_{18}$ hydrocarbylaminylsilyl group. Alternatively, each X independently can be H, $BH_4$, a halide, $OBR_2^1$, or $OSO_2R^1$, wherein $R^1$ is a $C_1$ to $C_{18}$ hydrocarbyl group. In another embodiment, each X independently can be H, $BH_4$, a halide, a $C_1$ to $C_{12}$ hydrocarbyl group, a $C_1$ to $C_{12}$ hydrocarboxy group, a $C_1$ to $C_{12}$ hydrocarbylaminyl group, a $C_1$ to $C_{12}$ hydrocarbylsilyl group, a $C_1$ to $C_{12}$ hydrocarbylaminylsilyl group, $OBR_2^1$, or $OSO_2R^1$, wherein $R^1$ is a $C_1$ to $C_{12}$ hydrocarbyl group. In another embodiment, each X independently can be H, $BH_4$, a halide, a $C_1$ to $C_{10}$ hydrocarbyl group, a $C_1$ to $C_{10}$ hydrocarboxy group, a $C_1$ to $C_{10}$ hydrocarbylaminyl group, a $C_1$ to $C_{10}$ hydrocarbylsilyl group, a $C_1$ to $C_{10}$ hydrocarbylaminylsilyl group, $OBR_2^1$, or $OSO_2R^1$, wherein $R^1$ is a $C_1$ to $C_{10}$ hydrocarbyl group. In yet another embodiment, each X independently can be H, $BH_4$, a halide, a $C_1$ to $C_8$ hydrocarbyl group, a $C_1$ to $C_8$ hydrocarboxy group, a $C_1$ to $C_8$ hydrocarbylaminyl group, a $C_1$ to $C_8$ hydrocarbylsilyl group, a $C_1$ to $C_8$ hydrocarbylaminylsilyl group, $OBR_2^1$, or $OSO_2R^1$, wherein $R^1$ is a $C_1$ to $C_8$ hydrocarbyl group. In still another embodiment, each X independently can be a halide or a $C_1$ to $C_{18}$ hydrocarbyl group. For example, each X can be Cl.

The hydrocarbyl group which can be an X (one or both) in formula (A) can be a $C_1$ to $C_{36}$ hydrocarbyl group, including, but not limited to, a $C_1$ to $C_{36}$ alkyl group, a $C_2$ to $C_{36}$ alkenyl group, a $C_4$ to $C_{36}$ cycloalkyl group, a $C_6$ to $C_{36}$ aryl group, or a $C_7$ to $C_{36}$ aralkyl group. For instance, each X independently can be a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, each X independently can be a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; alternatively, each X independently can be a $C_1$ to $C_{10}$ alkyl group, a $C_2$ to $C_{10}$ alkenyl group, a $C_4$ to $C_{10}$ cycloalkyl group, a $C_6$ to $C_{10}$ aryl group, or a $C_7$ to $C_{10}$ aralkyl group; or alternatively, each X independently can be a $C_1$ to $C_5$ alkyl group, a $C_2$ to $C_5$ alkenyl group, a $C_5$ to $C_8$ cycloalkyl group, a $C_6$ to $C_8$ aryl group, or a $C_7$ to $C_8$ aralkyl group.

Accordingly, in some embodiments, the alkyl group which can be an X in formula (A) can be a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In some embodiments, the alkyl group which can be an X in formula (A) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a tert-butyl group, or a neopentyl group; alternatively, a methyl group; alternatively, an ethyl group; alternatively, a n-propyl group; alternatively, an iso-propyl group; alternatively, a tert-butyl group; or alternatively, a neopentyl group.

Suitable alkenyl groups which can be an X in formula (A) can include, but are not limited to, an ethenyl group, a propenyl group, a butenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, or an octadecenyl group. Such alkenyl groups can be linear or branched, and the double bond can be located anywhere in the chain. In one embodiment, each X in formula (A) independently can be an ethenyl group, a propenyl group, a butenyl group, a pentenyl group, a hexenyl group, a heptenyl group, an octenyl group, a nonenyl group, or a decenyl group, while in another embodiment, each X in formula (A) independently can be an ethenyl group, a propenyl group, a butenyl group, a pentenyl group, or a hexenyl group. For example, an X can be an ethenyl group; alternatively, a propenyl group; alternatively, a butenyl group; alternatively, a pentenyl group; or alternatively, a hexenyl group. In yet another embodiment, an X can be a terminal alkenyl group, such as a $C_3$ to $C_{18}$ terminal alkenyl group, a $C_3$ to $C_{12}$ terminal alkenyl group, or a $C_3$ to $C_8$ terminal alkenyl group. Illustrative terminal alkenyl groups can include, but are not limited to, a prop-2-en-1-yl group, a bute-3-en-1-yl group, a pent-4-en-1-yl group, a hex-5-en-1-yl group, a hept-6-en-1-yl group, an octe-7-en-1-yl group, a non-8-en-1-yl group, a dece-9-en-1-yl group, and so forth.

Each X in formula (A) can be a cycloalkyl group, including, but not limited to, a cyclobutyl group, a substituted cyclobutyl group, a cyclopentyl group, a substituted cyclopentyl group, a cyclohexyl group, a substituted cyclohexyl group, a cycloheptyl group, a substituted cycloheptyl group, a cyclooctyl group, or a substituted cyclooctyl group. For example, an X in formula (A) can be a cyclopentyl group, a substituted cyclopentyl group, a cyclohexyl group, or a substituted cyclohexyl group. Moreover, each X in formula (A) independently can be a cyclobutyl group or a substituted cyclobutyl group; alternatively, a cyclopentyl group or a substituted cyclopentyl group; alternatively, a cyclohexyl group or a substituted cyclohexyl group; alternatively, a cycloheptyl group or a substituted cycloheptyl group; alternatively, a cyclooctyl group or a substituted cyclooctyl group; alternatively, a cyclopentyl group; alternatively, a substituted cyclopentyl group; alternatively, a cyclohexyl group; or alternatively, a substituted cyclohexyl group. Substituents which can be utilized for the substituted cycloalkyl group are independently disclosed herein and can be utilized without limitation to further describe the substituted cycloalkyl group which can be an X in formula (A).

In some embodiments, the aryl group which can be an X in formula (A) can be a phenyl group, a substituted phenyl group, a naphthyl group, or a substituted naphthyl group. In an embodiment, the aryl group can be a phenyl group or a substituted phenyl group; alternatively, a naphthyl group or a substituted naphthyl group; alternatively, a phenyl group or a naphthyl group; alternatively, a substituted phenyl group or a substituted naphthyl group; alternatively, a phenyl group; or alternatively, a naphthyl group. Substituents which can be utilized for the substituted phenyl groups or substituted naphthyl groups are independently disclosed herein and can be utilized without limitation to further describe the substituted phenyl groups or substituted naphthyl groups which can be an X in formula (A).

In an embodiment, the substituted phenyl group which can be an X in formula (A) can be a 2-substituted phenyl group, a 3-substituted phenyl group, a 4-substituted phenyl group, a 2,4-disubstituted phenyl group, a 2,6-disubstituted phenyl group, a 3,5-disubstituted phenyl group, or a 2,4,6-trisubstituted phenyl group. In other embodiments, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, a 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be an X group(s) in formula (A).

In some embodiments, the aralkyl group which can be an X group in formula (A) can be a benzyl group or a substituted benzyl group. In an embodiment, the aralkyl group can be a benzyl group or, alternatively, a substituted benzyl group. Substituents which can be utilized for the substituted aralkyl group are independently disclosed herein and can be utilized without limitation to further describe the substituted aralkyl group which can be an X group(s) in formula (A).

In an embodiment, each non-hydrogen substituent(s) for the substituted cycloalkyl group, substituted aryl group, or substituted aralkyl group which can be an X in formula (A) independently can be a $C_1$ to $C_{18}$ hydrocarbyl group; alternatively, a $C_1$ to $C_8$ hydrocarbyl group; or alternatively, a $C_1$ to $C_5$ hydrocarbyl group. Specific hydrocarbyl groups are independently disclosed herein and can be utilized without limitation to further describe the substituents of the substituted cycloalkyl groups, substituted aryl groups, or substituted aralkyl groups which can be an X in formula (A). For instance, the hydrocarbyl substituent can be an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like. Furthermore, the hydrocarbyl substituent can be a benzyl group, a phenyl group, a tolyl group, or a xylyl group, and the like.

A hydrocarboxy group is used generically herein to include, for instance, alkoxy, aryloxy, aralkoxy, -(alkyl, aryl, or aralkyl)-O-(alkyl, aryl, or aralkyl) groups, and —O(CO)-(hydrogen or hydrocarbyl) groups, and these groups can comprise up to about 36 carbon atoms (e.g., $C_1$ to $C_{36}$, $C_1$ to $C_{18}$, $C_1$ to $C_{10}$, or $C_1$ to $C_8$ hydrocarboxy groups). Illustrative and non-limiting examples of hydrocarboxy groups which can be an X in formula (A) can include, but are not limited to, a methoxy group, an ethoxy group, an n-propoxy group, an isopropoxy group, an n-butoxy group, a sec-butoxy group, an isobutoxy group, a tert-butoxy group, an n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), a formate group, an acetate group, a stearate group, an oleate group, a benzoate group, and the like. In an embodiment, the hydrocarboxy group which can be an X in formula (A) can be a methoxy group; alternatively, an ethoxy group; alternatively, an n-propoxy group; alternatively, an isopropoxy group; alternatively, an n-butoxy group; alternatively, a sec-butoxy group; alternatively, an isobutoxy group; alternatively, a tert-butoxy group; alternatively, an n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neo-pentoxy group; alternatively, a phenoxy group; alternatively, a toloxy group; alternatively, a xyloxy group; alternatively, a 2,4,6-trimethylphenoxy group; alternatively, a benzoxy group; alternatively, an acetylacetonate group; alternatively, a formate group; alternatively, an acetate group; alternatively, a stearate group; alternatively, an oleate group; or alternatively, a benzoate group.

The term hydrocarbylaminyl group is used generically herein to refer collectively to, for instance, alkylaminyl, arylaminyl, aralkylaminyl, dialkylaminyl, diarylaminyl, diaralkylaminyl, and -(alkyl, aryl, or aralkyl)-N-(alkyl, aryl, or aralkyl) groups, and unless otherwise specified, the hydrocarbylaminyl groups which can be an X in formula (A) can comprise up to about 36 carbon atoms (e.g., $C_1$ to $C_{36}$, $C_1$ to $C_{18}$, $C_1$ to $C_{10}$, or $C_1$ to $C_8$ hydrocarbylaminyl groups). Accordingly, hydrocarbylaminyl is intended to cover both (mono)hydrocarbylaminyl and dihydrocarbylaminyl groups. In some embodiments, the hydrocarbylaminyl group which can be an X in formula (A) can be, for instance, a methylaminyl group (—NHCH$_3$), an ethylaminyl group (—NHCH$_2$CH$_3$), an n-propylaminyl group (—NHCH$_2$CH$_2$CH$_3$), an iso-propylaminyl group (—NHCH(CH$_3$)$_2$), an n-butylaminyl group (—NHCH$_2$CH$_2$CH$_2$CH$_3$), a t-butylaminyl group (—NHC(CH$_3$)$_3$), an n-pentylaminyl group (—NHCH$_2$CH$_2$CH$_2$CH$_2$CH$_3$), a neo-pentylaminyl group (—NHCH$_2$C(CH$_3$)$_3$), a phenylaminyl group (—NHC$_6$H$_5$), a tolylaminyl group (—NHC$_6$H$_4$CH$_3$), or a xylylaminyl group (—NHC$_6$H$_3$(CH$_3$)$_2$); alternatively, a methylaminyl group; alternatively, an ethylaminyl group; alternatively, a propylaminyl group; or alternatively, a phenylaminyl group. In other embodiments, the hydrocarbylaminyl group which can be an X in formula (A) can be, for instance, a dimethylaminyl group (—N(CH$_3$)$_2$), a diethylaminyl group (—N(CH$_2$CH$_3$)$_2$), a di-n-propylaminyl group (—N(CH$_2$CH$_2$CH$_3$)$_2$), a di-iso-propylaminyl group (—N(CH(CH$_3$)$_2$)$_2$), a di-n-butylaminyl group (—N(CH$_2$CH$_2$CH$_2$CH$_3$)$_2$), a di-t-butylaminyl group (—N(C(CH$_3$)$_3$)$_2$), a di-n-pentylaminyl group (—N(CH$_2$CH$_2$CH$_2$CH$_2$CH$_3$)$_2$), a di-neo-pentylaminyl group (—N(CH$_2$C(CH$_3$)$_3$)$_2$), a di-phenylaminyl group (—N(C$_6$H$_5$)$_2$), a di-tolylaminyl group (—N(C$_6$H$_4$CH$_3$)$_2$), or a di-xylylaminyl group (—N(C$_6$H$_3$(CH$_3$)$_2$)$_2$); alternatively, a dimethylaminyl group; alternatively, a di-ethylaminyl group; alternatively, a di-n-propylaminyl group; or alternatively, a di-phenylaminyl group.

In accordance with some embodiments disclosed herein, each X independently can be a $C_1$ to $C_{36}$ hydrocarbylsilyl group; alternatively, a $C_1$ to $C_{24}$ hydrocarbylsilyl group; alternatively, a $C_1$ to $C_{18}$ hydrocarbylsilyl group; or alternatively, a $C_1$ to $C_8$ hydrocarbylsilyl group. In an embodiment, each hydrocarbyl (one or more) of the hydrocarbylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). As used herein, hydrocarbylsilyl is intended to cover (mono)hydrocarbylsilyl (—SiH$_2$R), dihydrocarbylsilyl (—SiHR$_2$), and trihydrocarbylsilyl (—SiR$_3$) groups, with R being a hydrocarbyl group. In one embodiment, the hydrocarbylsilyl group can be a $C_3$ to $C_{36}$ or a $C_3$ to $C_{18}$ trihydrocarbylsilyl group, such as, for example, a trialkylsilyl group or a triphenylsilyl group. Illustrative and non-limiting examples of hydrocarbylsilyl groups which can be an X group(s) in formula (A) can include, but are not limited to, trimethylsilyl, triethylsilyl, tripropylsilyl (e.g., triisopropylsilyl), tributylsilyl, tripentylsilyl, triphenylsilyl, allyldimethylsilyl, and the like.

A hydrocarbylaminylsilyl group is used herein to refer to groups containing at least one hydrocarbon moiety, at least one N atom, and at least one Si atom. Illustrative and non-limiting examples of hydrocarbylaminylsilyl groups which can be an X can include, but are not limited to —N(SiMe$_3$)$_2$, —N(SiEt$_3$)$_2$, and the like. Unless otherwise specified, the hydrocarbylaminylsilyl groups which can be X can comprise up to about 36 carbon atoms (e.g., $C_1$ to $C_{36}$, $C_1$ to $C_{18}$, $C_1$ to $C_{12}$, or $C_1$ to $C_8$ hydrocarbylaminylsilyl groups). In an embodiment, each hydrocarbyl (one or more) of the hydrocarbylaminylsilyl group can be any hydrocarbyl group disclosed herein (e.g., a $C_1$ to $C_5$ alkyl group, a $C_2$ to $C_5$ alkenyl group, a $C_5$ to $C_8$ cycloalkyl group, a $C_6$ to $C_8$ aryl group, a $C_7$ to $C_8$ aralkyl group, etc.). Moreover, hydrocarbylaminylsilyl is intended to cover —NH(SiH$_2$R), —NH(SiHR$_2$), —NH(SiR$_3$), —N(SiH$_2$R)$_2$, —N(SiHR$_2$)$_2$, and —N(SiR$_3$)$_2$ groups, among others, with R being a hydrocarbyl group.

In an embodiment, each X independently can be —OBR$_2^1$ or —OSO$_2$R$^1$, wherein R$^1$ is a $C_1$ to $C_{36}$ hydrocarbyl group, or alternatively, a $C_1$ to $C_{18}$ hydrocarbyl group. The hydrocarbyl group in OBR$_2^1$ and/or OSO$_2$R$^1$ independently can be any hydrocarbyl group disclosed herein, such as, for instance, a $C_1$ to $C_{18}$ alkyl group, a $C_2$ to $C_{18}$ alkenyl group, a $C_4$ to $C_{18}$ cycloalkyl group, a $C_6$ to $C_{18}$ aryl group, or a $C_7$ to $C_{18}$ aralkyl group; alternatively, a $C_1$ to $C_{12}$ alkyl group, a $C_2$ to $C_{12}$ alkenyl group, a $C_4$ to $C_{12}$ cycloalkyl group, a $C_6$ to $C_{12}$ aryl group, or a $C_7$ to $C_{12}$ aralkyl group; or alternatively, a $C_1$ to $C_8$ alkyl group, a $C_2$ to $C_8$ alkenyl group, a $C_5$ to $C_8$ cycloalkyl group, a $C_6$ to $C_8$ aryl group, or a $C_7$ to $C_8$ aralkyl group.

In one embodiment, each X independently can be H, BH$_4$, a halide, or a $C_1$ to $C_{36}$ hydrocarbyl group, hydrocarboxy group, hydrocarbylaminyl group, hydrocarbylsilyl group, or hydrocarbylaminylsilyl group, while in another embodiment, each X independently can be H, BH$_4$, or a $C_1$ to $C_{18}$ hydrocarboxy group, hydrocarbylaminyl group, hydrocarbylsilyl group, or hydrocarbylaminylsilyl group. In yet another embodiment, each X independently can be a halide; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group. In still another embodiment, each X can be H; alternatively, F; alternatively, Cl; alternatively, Br; alternatively, I; alternatively, $BH_4$; alternatively, a $C_1$ to $C_{18}$ hydrocarbyl group; alternatively, a $C_1$ to $C_{18}$ hydrocarboxy group; alternatively, a $C_1$ to $C_{18}$ hydrocarbylaminyl group; alternatively, a $C_1$ to $C_{18}$ hydrocarbylsilyl group; or alternatively, a $C_1$ to $C_{18}$ hydrocarbylaminylsilyl group.

Each X independently can be, in some embodiments, H, a halide, methyl, phenyl, benzyl, an alkoxy, an aryloxy, acetylacetonate, formate, acetate, stearate, oleate, benzoate, an alkylaminyl, a dialkylaminyl, a trihydrocarbylsilyl, or a hydrocarbylaminylsilyl; alternatively, H, a halide, methyl, phenyl, or benzyl; alternatively, an alkoxy, an aryloxy, or acetylacetonate; alternatively, an alkylaminyl or a dialkylaminyl; alternatively, a trihydrocarbylsilyl or hydrocarbylaminylsilyl; alternatively, H or a halide; alternatively, methyl, phenyl, benzyl, an alkoxy, an aryloxy, acetylacetonate, an alkylaminyl, or a dialkylaminyl; alternatively, H; alternatively, a halide; alternatively, methyl; alternatively, phenyl; alternatively, benzyl; alternatively, an alkoxy; alternatively, an aryloxy; alternatively, acetylacetonate; alternatively, an alkylaminyl; alternatively, a dialkylaminyl; alternatively, a trihydrocarbylsilyl; or alternatively, a hydrocarbylaminylsilyl. In these and other embodiments, the alkoxy, aryloxy, alkylaminyl, dialkylaminyl, trihydrocarbylsilyl, and hydrocarbylaminylsilyl can be a $C_1$ to $C_{36}$, a $C_1$ to $C_{18}$, a $C_1$ to $C_{12}$, or a $C_1$ to $C_8$ alkoxy, aryloxy, alkylaminyl, dialkylaminyl, trihydrocarbylsilyl, and hydrocarbylaminylsilyl.

Moreover, each X independently can be, in certain embodiments, a halide or a $C_1$ to $C_{18}$ hydrocarbyl group; alternatively, a halide or a $C_1$ to $C_8$ hydrocarbyl group; alternatively, F, Cl, Br, I, methyl, benzyl, or phenyl; alternatively, Cl, methyl, benzyl, or phenyl; alternatively, a $C_1$ to $C_{18}$ alkoxy, aryloxy, alkylaminyl, dialkylaminyl, trihydrocarbylsilyl, or hydrocarbylaminylsilyl group; alternatively, a $C_1$ to $C_8$ alkoxy, aryloxy, alkylaminyl, dialkylaminyl, trihydrocarbylsilyl, or hydrocarbylaminylsilyl group; or alternatively, methyl, ethyl, propyl, butyl, pentyl, hexyl, heptyl, octyl, nonyl, decyl, ethenyl, propenyl, butenyl, pentenyl, hexenyl, heptenyl, octenyl, nonenyl, decenyl, phenyl, tolyl, benzyl, naphthyl, trimethylsilyl, triisopropylsilyl, triphenylsilyl, or allyldimethylsilyl.

In formula (A), $Cp^1$ and $Cp^2$ independently can be a cyclopentadienyl or indenyl group. In one embodiment, $Cp^1$ and $Cp^2$ contain no additional substituents, e.g., other than the bridging group (discussed herein below). For instance, $Cp^1$ and $Cp^2$ can be indenyl groups containing no additional substituents, e.g., other than the bridging group. Alternatively, $Cp^1$ and $Cp^2$ independently can be a substituted indenyl or cyclopentadienyl group, for example, having 1 substituent, having 2 substituents, having 3 substituents, having 4 substituents, having 5 substituents, etc.

If present, each substituent on $Cp^1$ and $Cp^2$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on $Cp^1$ and/or on $Cp^2$ can be either the same or a different substituent group. Moreover, each substituent can be at any position on the respective cyclopentadienyl or indenyl ring structure that conforms with the rules of chemical valence. In an embodiment, the number of substituents on $Cp^1$ and/or on $Cp^2$ and/or the positions of each substituent on $Cp^1$ and/or on $Cp^2$ are independent of each other. For instance, two or more substituents on $Cp^1$ can be different, or alternatively, each substituent on $Cp^1$ can be the same. Additionally or alternatively, two or more substituents on $Cp^2$ can be different, or alternatively, all substituents on $Cp^2$ can be the same. In another embodiment, one or more of the substituents on $Cp^1$ can be different from the one or more of the substituents on $Cp^2$, or alternatively, all substituents on both $Cp^1$ and/or on $Cp^2$ can be the same. In these and other embodiments, each substituent can be at any position on the respective cyclopentadienyl or indenyl ring structure. If substituted, $Cp^1$ and/or $Cp^2$ independently can have 1 substituent, 2 substituents, 3 substituents, 4 substituents, and so forth.

In formula (A), each substituent on $Cp^1$ and/or on $Cp^2$ independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. In some embodiments, each substituent independently can be H; alternatively, a halide; alternatively, a $C_1$ to $C_{18}$ hydrocarbyl group; alternatively, a $C_1$ to $C_{18}$ halogenated hydrocarbyl group; alternatively, a $C_1$ to $C_{18}$ hydrocarboxy group; alternatively, a $C_1$ to $C_{18}$ hydrocarbylsilyl group; alternatively, a $C_1$ to $C_{12}$ hydrocarbyl group or a $C_1$ to $C_{12}$ hydrocarbylsilyl group; or alternatively, a $C_1$ to $C_8$ alkyl group or a $C_3$ to $C_8$ alkenyl group. The halide, $C_1$ to $C_{36}$ hydrocarbyl group, $C_1$ to $C_{36}$ hydrocarboxy group, and $C_1$ to $C_{36}$ hydrocarbylsilyl group which can be a substituent on $Cp^1$ and/or on $Cp^2$ in formula (A) can be any halide, $C_1$ to $C_{36}$ hydrocarbyl group, $C_1$ to $C_{36}$ hydrocarboxy group, and $C_1$ to $C_{36}$ hydrocarbylsilyl group described herein (e.g., as pertaining to X in formula (A)). A substituent on $Cp^1$ and/or on $Cp^2$ in formula (A) can be, in certain embodiments, a $C_1$ to $C_{36}$ halogenated hydrocarbyl group, where the halogenated hydrocarbyl group indicates the presence of one or more halogen atoms replacing an equivalent number of hydrogen atoms in the hydrocarbyl group. The halogenated hydrocarbyl group often can be a halogenated alkyl group, a halogenated alkenyl group, a halogenated cycloalkyl group, a halogenated aryl group, or a halogenated aralkyl group. Representative and non-limiting halogenated hydrocarbyl groups include pentafluorophenyl, trifluoromethyl ($CF_3$), and the like.

As a non-limiting example, if present, each substituent on $Cp^1$ and/or $Cp^2$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group (or other substituted aryl group), a benzyl group, a naphthyl group, a trimethylsilyl group, a triisopropylsilyl group, a triphenylsilyl group, or an allyldimethylsilyl group; alternatively, H or a $C_1$ to $C_{18}$ hydrocarbyl group; alternatively, H; alternatively, Cl; alternatively, $CF_3$; alternatively, a methyl group; alternatively, an ethyl group; alternatively, a propyl group; alternatively, a butyl group; alternatively, a pentyl group; alternatively, a hexyl group; alternatively, a heptyl group; alternatively, an octyl group, a nonyl group; alternatively, a decyl group; alternatively, an ethenyl group; alternatively, a propenyl group; alternatively, a butenyl group; alternatively, a pentenyl group; alternatively, a hexenyl group; alternatively, a heptenyl group; alternatively, an octenyl group; alternatively, a nonenyl group; alternatively, a decenyl group; alternatively, a phenyl group; alternatively, a tolyl group; alternatively, a benzyl group; alternatively, a naphthyl group; alternatively, a trimethylsilyl group; alternatively, a triisopropylsilyl group; alternatively, a triphenylsilyl group; or alternatively, an allyldimethylsilyl group.

Bridging group $E^1$ in formula (A) can have the formula $-CR^{1A}R^{1B}-CR^{2A}R^{2B}-$, wherein $R^{1A}$, $R^{1B}$, $R^{2A}$, and $R^{2B}$ independently are H or a $C_1$-$C_{10}$ hydrocarbyl group (any $C_1$-$C_{10}$ hydrocarbyl group disclosed herein). For instance, $R^{1A}$, $R^{1B}$, $R^{2A}$, and $R^{2B}$ independently can be H or a $C_1$ to $C_8$ hydrocarbyl group; alternatively, H, a phenyl group, a $C_1$ to $C_8$ alkyl group, or a $C_3$ to $C_8$ alkenyl group; alternatively, H, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group; alternatively, H or a methyl group; or alternatively, H (i.e., $E^1$ is a bridging group of the formula $-CH_2-CH_2-$).

Illustrative and non-limiting examples of two-carbon bridged metallocene compounds having formula (A) and/or suitable for use as catalyst component I can include compounds having the following formula:

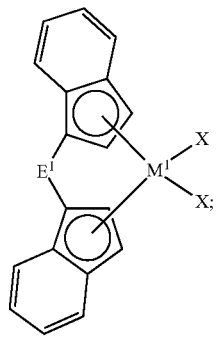

wherein:

$M^1$ can be Zr or Hf (e.g., $M^1$ can be Zr); $E^1$ can be a bridging group having the formula $-CR^{1A}R^{1B}-CR^{2A}R^{2B}-$ (e.g., $E^1$ can be $-CH_2-CH_2-$); and each X independently can be a monoanionic ligand (e.g., each X can be Cl).

In an embodiment, catalyst component I can comprise an unbridged zirconium based metallocene compound with two cyclopentadienyl groups. In another embodiment, catalyst component I can comprise a single atom bridged (C or Si), zirconium based metallocene compound with two cyclopentadienyl groups (e.g., with an alkyl substituent, such as propyl). In yet another embodiment, catalyst component I can comprise a single atom bridged (C or Si), zirconium based metallocene compound with two indenyl groups (e.g., meso-bridged). In still another embodiment, catalyst component I can comprise a 3-5 carbon atom bridged, zirconium based metallocene compound with two indenyl groups (e.g., rac-bridged).

Catalyst component I can comprise, in particular embodiments of this invention, an unbridged metallocene compound having formula (A2):

Within formula (A2), $M^1$, $Cp^A$, $Cp^B$, and each X are independent elements of the unbridged metallocene compound. Accordingly, the unbridged metallocene compound having formula (A2) can be described using any combination of $M^1$, $Cp^A$, $Cp^B$, and X disclosed herein. The monoanionic ligand selections for X and transition metals for $M^1$ in formula (A2) are the same as those described herein above for formula (A).

In formula (A2), $Cp^A$ and $Cp^B$ independently can be a substituted or unsubstituted cyclopentadienyl or indenyl group. In one embodiment, $Cp^A$ and $Cp^B$ independently can be an unsubstituted cyclopentadienyl or indenyl group. Alternatively, $Cp^A$ and $Cp^B$ independently can be a substituted indenyl or cyclopentadienyl group, for example, having up to 5 substituents (e.g., any substituent disclosed herein). In a particular embodiment, $Cp^A$ and $Cp^B$ independently can be an unsubstituted cyclopentadienyl group or an alkyl-substituted cyclopentadienyl group, for example, with one methyl, ethyl, propyl, or butyl substituent.

Illustrative and non-limiting examples of metallocene compounds having formula (A2) and/or suitable for use as catalyst component I can include the following compounds:

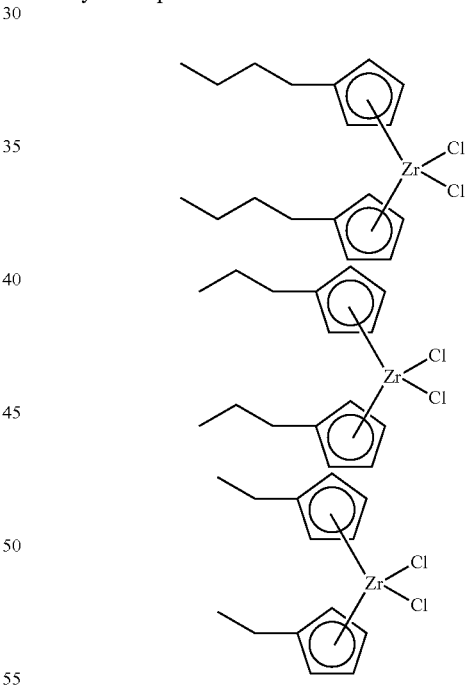

Catalyst Component II

Catalyst component II generally can produce a higher molecular weight component having more short chain branches and less long chain branches than the lower molecular weight component. Catalyst component II can comprise a single atom bridged metallocene compound containing a fluorenyl group. In certain embodiments disclosed herein, for instance, catalyst component II can comprise a single atom bridged, zirconium or hafnium based metallocene compound containing a cyclopentadienyl group and a fluorenyl group. Often, the single bridging atom can be a carbon atom or silicon atom. In some embodiments, the bridging group (bridging atom and any substituents) can contain an aryl substituent (e.g., a phenyl group); additionally or alternatively, the bridging group can contain an alkenyl substituent (e.g., a $C_3$-$C_8$ terminal alkenyl group).

Catalyst component II can comprise, in particular embodiments of this invention, a bridged metallocene compound having formula (B):

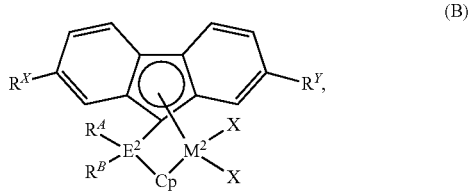

(B)

Within formula (B), $M^2$, Cp, $E^2$, $R^A$, $R^B$, $R^X$, $R^Y$, and each X are independent elements of the bridged metallocene compound. Accordingly, the bridged metallocene compound having formula (B) can be described using any combination of $M^2$, Cp, $E^2$, $R^A$, $R^B$, $R^X$, $R^Y$, and X disclosed herein.

The selections for $M^2$ and each X in formula (B) are the same as those described hereinabove for $M^1$ (Zr of Hf) and X (monoanionic ligand, e.g., Cl) in formula (A). In formula (B), Cp can be a cyclopentadienyl group. In some embodiments, Cp can contain no additional substituents, e.g., other than bridging group $E^2$, discussed herein below. In other embodiments, Cp can be further substituted with 1 substituent, 2 substituents, 3 substituents, and so forth. If present, each substituent on Cp independently can be H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group. Importantly, each substituent on Cp can be either the same or a different substituent group. Moreover, each substituent can be at any position on the cyclopentadienyl ring structure that conforms with the rules of chemical valence. In general, any substituent on Cp, independently, can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group described herein (e.g., as pertaining to substituents on $Cp^1$ and $Cp^2$ in formula (A)).

In one embodiment, for example, each substituent on Cp independently can be H or a $C_1$ to $C_{18}$ hydrocarbyl group or $C_1$ to $C_{18}$ hydrocarbylsilyl group. In another embodiment, each substituent on Cp independently can be a $C_1$ to $C_8$ alkyl group or a $C_3$ to $C_8$ alkenyl group. In yet another embodiment, each substituent on $Cp^C$ independently can be H, Cl, $CF_3$, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group.

Similarly, $R^X$ and $R^Y$ in formula (B) independently can be H or any halide, $C_1$ to $C_{36}$ hydrocarbyl group, $C_1$ to $C_{36}$ halogenated hydrocarbyl group, $C_1$ to $C_{36}$ hydrocarboxy group, or $C_1$ to $C_{36}$ hydrocarbylsilyl group disclosed herein (e.g., as pertaining to substituents on $Cp^1$ and $Cp^2$ in formula (A)). In one embodiment, for example, $R^X$ and $R^Y$ independently can be H or a $C_1$ to $C_{12}$ hydrocarbyl group. In another embodiment, $R^X$ and $R^Y$ independently can be a $C_1$ to $C_{10}$ hydrocarbyl group. In yet another embodiment, $R^X$ and $R^Y$ independently can be H, Cl, $CF_3$, a methyl group, an ethyl group, a propyl group, a butyl group (e.g., t-Bu), a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, a benzyl group, a naphthyl group, a trimethylsilyl group, a triisopropylsilyl group, a triphenylsilyl group, or an allyldimethylsilyl group, and the like. In still another embodiment, $R^X$ and $R^Y$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group; or alternatively, H or a $C_1$ to $C_6$ linear or branched alkyl group (e.g., methyl, tert-butyl, etc.).

For the bridging group in formula (B), $E^2$ can be C or Si, and $R^A$ and $R^B$ independently can be H or any $C_1$ to $C_{18}$ hydrocarbyl group disclosed herein. $R^A$ and $R^B$ can be either the same or different. In some embodiments of this invention, $E^2$ can be C. In these and other embodiments, $R^A$ and $R^B$ independently can be a $C_1$ to $C_{12}$ hydrocarbyl group; alternatively, $R^A$ and $R^B$ independently can be a $C_1$ to $C_8$ hydrocarbyl group; alternatively, $R^A$ and $R^B$ independently can be a phenyl group, a $C_1$ to $C_8$ alkyl group, or a $C_3$ to $C_8$ alkenyl group; alternatively, $R^A$ and $R^B$ independently can be a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group; or alternatively, $R^A$ and $R^B$ independently can be a methyl group, an ethyl group, a propyl group, a butyl group, a pentyl group, a hexyl group, a propenyl group, a butenyl group, a pentenyl group, a hexenyl group, a phenyl group, or a benzyl group. In particular embodiments of this invention, at least one of $R^A$ and $R^B$ can be a phenyl group; additionally or alternatively, at least one of $R^A$ and $R^B$ can be a $C_3$ to $C_8$ terminal alkenyl group.

Illustrative and non-limiting examples of bridged metallocene compounds having formula (B) and/or suitable for use as catalyst component II can include the following compounds (Me=methyl, Ph=phenyl; t-Bu=tert-butyl):

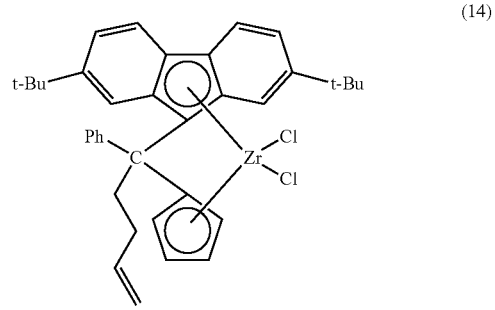

(14)

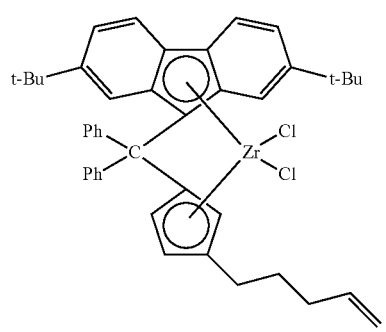
(15)
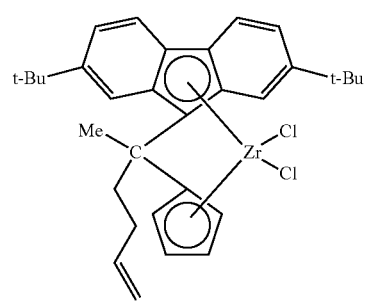
(16)
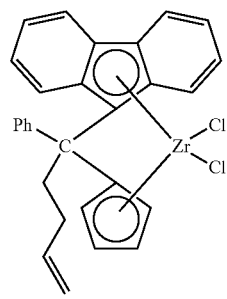
(17)
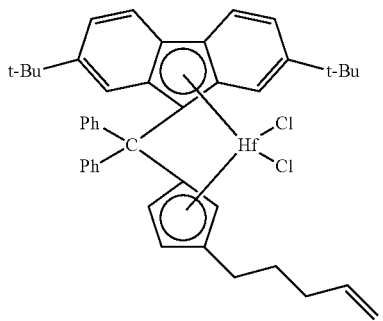
(18)
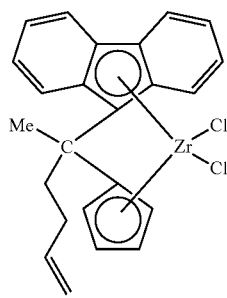
(19)
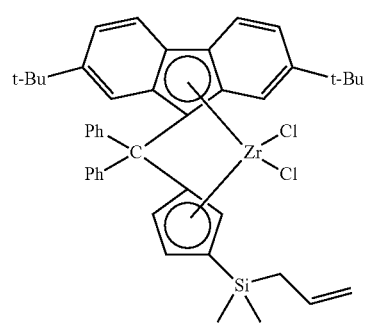
(20)
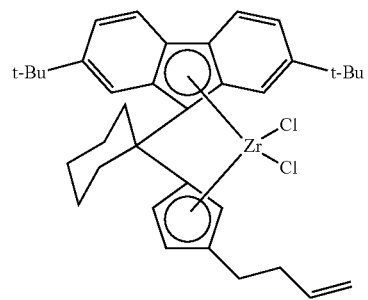
(21)
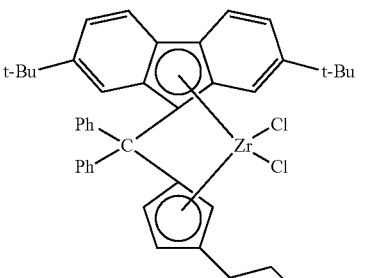
(22)
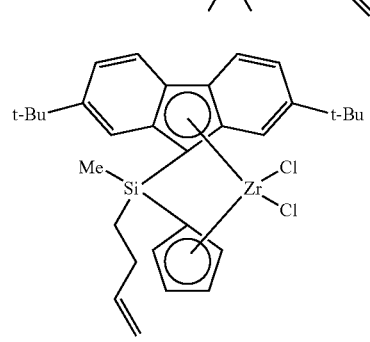
(23)
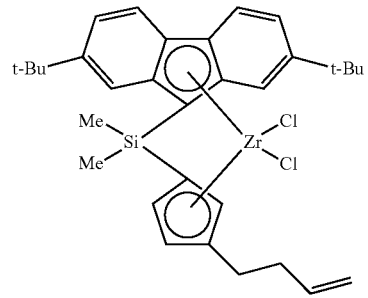
(24)

-continued

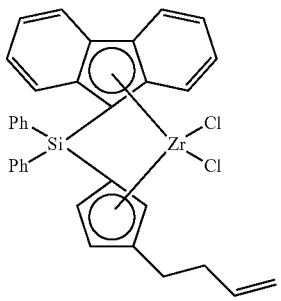

(25)

and the like, as well as combinations thereof.

Catalyst component II is not limited solely to the bridged metallocene compounds such as described above. Other suitable single atom bridged metallocene compounds are disclosed in U.S. Pat. Nos. 7,026,494, 7,041,617, 7,226,886, 7,312,283, 7,517,939, and 7,619,047, which are incorporated herein by reference in their entirety.

Activator-supports

The present invention encompasses various catalyst compositions containing an activator-support. In one embodiment, the activator-support can comprise a solid oxide treated with an electron-withdrawing anion. Alternatively, in another embodiment, the activator-support can comprise a solid oxide treated with an electron-withdrawing anion, the solid oxide containing a Lewis-acidic metal ion. Non-limiting examples of suitable activator-supports are disclosed in, for instance, U.S. Pat. Nos. 7,294,599, 7,601,665, 7,884,163, and 8,309,485, which are incorporated herein by reference in their entirety.

The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163.

Accordingly, in one embodiment, the solid oxide can comprise silica, alumina, silica-alumina, silica-coated alumina, aluminum phosphate, aluminophosphate, heteropolytungstate, titania, silica-titania, zirconia, silica-zirconia, magnesia, boria, zinc oxide, any mixed oxide thereof, or any combination thereof. In another embodiment, the solid oxide can comprise alumina, silica-alumina, silica-coated alumina, aluminum phosphate, aluminophosphate, heteropolytungstate, titania, silica-titania, zirconia, silica-zirconia, magnesia, boria, or zinc oxide, as well as any mixed oxide thereof, or any mixture thereof. In another embodiment, the solid oxide can comprise silica, alumina, titania, zirconia, magnesia, boria, zinc oxide, any mixed oxide thereof, or any combination thereof. In yet another embodiment, the solid oxide can comprise silica-alumina, silica-coated alumina, silica-titania, silica-zirconia, alumina-boria, or any combination thereof. In still another embodiment, the solid oxide can comprise alumina, silica-alumina, silica-coated alumina, or any mixture thereof; alternatively, alumina; alternatively, silica-alumina; or alternatively, silica-coated alumina.

The silica-alumina or silica-coated alumina solid oxide materials which can be used can have an silica content from about 5 to about 95% by weight. In one embodiment, the silica content of these solid oxides can be from about 10 to about 80%, or from about 20% to about 70%, silica by weight. In another embodiment, such materials can have silica contents ranging from about 15% to about 60%, or from about 25% to about 50%, silica by weight. The solid oxides contemplated herein can have any suitable surface area, pore volume, and particle size, as would be recognized by those of skill in the art.

The electron-withdrawing component used to treat the solid oxide can be any component that increases the Lewis or Bronsted acidity of the solid oxide upon treatment (as compared to the solid oxide that is not treated with at least one electron-withdrawing anion). According to one embodiment, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some embodiments provided herein. In other embodiments, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other embodiments, the electron-withdrawing anion can comprise fluoride and/or sulfate.

The activator-support generally can contain from about 1 to about 25 wt. % of the electron-withdrawing anion, based on the weight of the activator-support. In particular embodiments provided herein, the activator-support can contain from about 1 to about 20 wt. %, from about 2 to about 20 wt. %, from about 3 to about 20 wt. %, from about 2 to about 15 wt. %, from about 3 to about 15 wt. %, from about 3 to about 12 wt. %, or from about 4 to about 10 wt. %, of the electron-withdrawing anion, based on the total weight of the activator-support.

In an embodiment, the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another embodiment, the activator-support employed in the catalyst systems described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. In yet another embodiment, the activator-support can comprise fluorided alumina; alternatively, chlorided alumina; alternatively, sulfated alumina; alternatively, fluorided silica-alumina; alternatively, sulfated silica-alumina; alternatively, fluorided silica-zirconia; alternatively, chlorided silica-zirconia; alternatively, sulfated silica-coated alumina; or alternatively, fluorided silica-coated alumina.

Various processes can be used to form activator-supports useful in the present invention. Methods of contacting the solid oxide with the electron-withdrawing component, suitable electron withdrawing components and addition amounts, impregnation with metals or metal ions (e.g., zinc, nickel, vanadium, titanium, silver, copper, gallium, tin, tungsten, molybdenum, zirconium, and the like, or combinations thereof), and various calcining procedures and conditions are disclosed in, for example, U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, 6,750,302, 7,294,599, 7,601,665, 7,884,163, and 8,309,485, which are incorporated herein by reference in their entirety. Other suitable processes and procedures for preparing activator-supports (e.g., fluorided solid oxides, sulfated solid oxides, etc.) are well known to those of skill in the art.

Co-Catalysts

In certain embodiments directed to catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some embodiments, the metal of the metal hydrocarbyl can be a group 1, 2, 11, 12, 13, or 14 metal; alternatively, a group 13 or 14 metal; or alternatively, a group 13 metal. Hence, in some embodiments, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some embodiments, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular embodiments directed to catalyst compositions containing a co-catalyst (e.g., the activator can comprise a solid oxide treated with an electron-withdrawing anion), the co-catalyst can comprise an aluminoxane compound, an organoboron or organoborate compound, an ionizing ionic compound, an organoaluminum compound, an organozinc compound, an organomagnesium compound, or an organolithium compound, and this includes any combinations of these materials. In one embodiment, the co-catalyst can comprise an organoaluminum compound. In another embodiment, the co-catalyst can comprise an aluminoxane compound, an organoboron or organoborate compound, an ionizing ionic compound, an organozinc compound, an organomagnesium compound, an organolithium compound, or any combination thereof. In yet another embodiment, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoboron/organoborate compounds include N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, tris (pentafluorophenyl)boron, tris[3,5-bis(trifluoromethyl)phenyl]boron, and the like, or mixtures thereof.

Examples of ionizing ionic compounds can include, but are not limited to, the following compounds: tri(n-butyl) ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis[3,5-bis(trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl] borate, triphenylcarbenium tetrakis (pentafluorophenyl)borate, tropylium tetrakis(p-tolyl) borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis (trifluoromethyl)phenyl]borate, tropylium tetrakis (pentafluorophenyl) borate, lithium tetrakis (pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis (m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2, 4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, and the like, or combinations thereof.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Co-catalysts that can be used in the catalyst compositions of this invention are not limited to the co-catalysts described above. Other suitable co-catalysts are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an embodiment, the olefin monomer can comprise a $C_2$-$C_{2o}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some embodiments, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one embodiment of this invention, the olefin monomer used in the polymerization process can comprise ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another embodiment of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent of the comonomer based on the total weight of the monomer and comonomer. According to another embodiment of the present invention, the amount of comonomer introduced into a polymerization reactor system can be from about 0.01 to about 40 weight percent comonomer based on the total weight of the monomer and comonomer. In still another embodiment, the amount of comonomer introduced into a polymerization reactor system can be from about 0.1 to about 35 weight percent comonomer based on the total weight of the monomer and comonomer. Yet, in another embodiment, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Compositions

In some embodiments, the present invention can employ catalyst compositions containing catalyst component I, catalyst component II, an activator (one or more than one), and optionally, a co-catalyst. These catalyst compositions can be utilized to produce polyolefins—homopolymers, copolymers, and the like—for a variety of end-use applications. Catalyst components I and II are discussed hereinabove. In embodiments of the present invention, it is contemplated that the catalyst composition can contain more than one catalyst component I metallocene compound, and/or more than one catalyst component II metallocene compound. Further, additional catalytic compounds—other than those specified as catalyst component I or II—can be employed in the catalyst compositions and/or the polymerization processes, provided that the additional catalytic compound(s) does not detract from the advantages disclosed herein. Additionally, more than one activator also may be utilized.

The metallocene compounds of catalyst component I are discussed hereinabove. For instance, in some embodiments, catalyst component I can comprise (or consist essentially of, or consist of) a two carbon bridged metallocene compound containing two cyclopentadienyl groups, two indenyl groups, or a cyclopentadienyl and an indenyl group (e.g., a metallocene compound having formula (A)). The metallocene compounds of catalyst component II also are discussed hereinabove. For instance, in some embodiments, catalyst component II can comprise (or consist essentially of, or consist of) a single atom bridged metallocene compound containing a fluorenyl group (e.g., a metallocene compound having formula (B)).

Generally, catalyst compositions of the present invention can comprise catalyst component I, catalyst component II, and an activator. In embodiments of the invention, the activator can comprise an activator-support (e.g., an activator-support comprising a solid oxide treated with an electron-withdrawing anion). Activator-supports useful in the present invention are disclosed hereinabove. Optionally, such catalyst compositions can further comprise one or more than one co-catalyst compound or compounds (suitable co-catalysts, such as organoaluminum compounds, also are discussed hereinabove). Thus, a catalyst composition of this invention can comprise catalyst component I, catalyst component II, an activator-support, and an organoaluminum compound. For instance, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof; alternatively, the activator-support can comprise (or consist essentially of, or consist of) a fluorided solid oxide and/or a sulfated solid oxide. Additionally, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Accordingly, a catalyst composition consistent with embodiments of the invention can comprise (or consist essentially of, or consist of) a two carbon bridged, zirconium based metallocene compound; a single atom bridged, zirconium or hafnium based metallocene compound with cyclopentadienyl group and a fluorenyl group; sulfated alumina (or fluorided silica-alumina, or fluorided silica-coated alumina); and triethylaluminum (or triisobutylaluminum).

In another embodiment of the present invention, a catalyst composition is provided which comprises catalyst component I, catalyst component II, an activator-support, and an organoaluminum compound, wherein this catalyst composition is substantially free of aluminoxanes, organoboron or organoborate compounds, ionizing ionic compounds, and/or other similar materials; alternatively, substantially free of aluminoxanes; alternatively, substantially free or organoboron or organoborate compounds; or alternatively, substantially free of ionizing ionic compounds. In these embodiments, the catalyst composition has catalyst activity, discussed below, in the absence of these additional materials. For example, a catalyst composition of the present invention can consist essentially of catalyst component I, catalyst component II, an activator-support, and an organoaluminum compound, wherein no other materials are present in the catalyst composition which would increase/decrease the activity of the catalyst composition by more than about 10% from the catalyst activity of the catalyst composition in the absence of said materials.

However, in other embodiments of this invention, these activators/co-catalysts can be employed. For example, a catalyst composition comprising catalyst component I, catalyst component II, and an activator-support can further comprise a co-catalyst. Suitable co-catalysts in this embodiment can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof; or alternatively, organoaluminum compounds, organozinc compounds, organomagnesium compounds, organolithium compounds, or any combination thereof. More than one co-catalyst can be present in the catalyst composition.

In a different embodiment, a catalyst composition is provided which does not require an activator-support. Such a catalyst composition can comprise catalyst component I, catalyst component II, and an activator, wherein the activator comprises an aluminoxane compound, an organoboron or organoborate compound, an ionizing ionic compound, or combinations thereof; alternatively, an aluminoxane compound; alternatively, an organoboron or organoborate compound; or alternatively, an ionizing ionic compound.

In a particular embodiment contemplated herein, the catalyst composition is a catalyst composition comprising an activator (one or more than one), only one catalyst component I metallocene compound, and only one catalyst component II metallocene compound. In these and other embodiments, the catalyst composition can comprise an activator (e.g., an activator-support comprising a solid oxide treated with an electron-withdrawing anion); only one two carbon bridged metallocene compound containing two cyclopentadienyl groups, two indenyl groups, or a cyclopentadienyl and an indenyl group; only one single atom bridged metallocene compound containing a fluorenyl group; and optionally, a co-catalyst.

This invention further encompasses methods of making these catalyst compositions, such as, for example, contacting the respective catalyst components in any order or sequence.

According to an embodiment of this invention, the weight percentage of catalyst component I, based on the total weight of catalyst component I and catalyst component II in the catalyst composition, typically can fall within a range from about 25 to about 98%, from about 40 to about 95%, from about 55 to about 98%, or from about 60 to about 95%.

Generally, the weight ratio of organoaluminum compound to activator-support can be in a range from about 10:1 to about 1:1000. If more than one organoaluminum compound and/or more than one activator-support is employed, this ratio is based on the total weight of each respective component. In another embodiment, the weight ratio of the organoaluminum compound to the activator-support can be in a range from about 3:1 to about 1:100, or from about 1:1 to about 1:50.

In some embodiments of this invention, the weight ratio of metallocene compounds (total of catalyst component I and II) to activator-support can be in a range from about 1:1 to about 1:1,000,000. If more than one activator-support is employed, this ratio is based on the total weight of the activator-support. In another embodiment, this weight ratio can be in a range from about 1:5 to about 1:100,000, or from about 1:10 to about 1:10,000. Yet, in another embodiment, the weight ratio of the metallocene compounds to the activator-support can be in a range from about 1:20 to about 1:1000.

Catalyst compositions of the present invention generally have a catalyst activity greater than about 100 grams of polyethylene (homopolymer, copolymer, etc., as the context requires) per gram of activator-support per hour (abbreviated g/g/hr). In another embodiment, the catalyst activity can greater than about 150, greater than about 250, or greater than about 500 g/g/hr. In still another embodiment, catalyst compositions of this invention can be characterized by having a catalyst activity greater than about 550, greater than about 650, or greater than about 750 g/g/hr. Yet, in another embodiment, the catalyst activity can be greater than about 1000 g/g/hr. These activities are measured under slurry polymerization conditions, with a triisobutylaluminum co-catalyst, using isobutane as the diluent, at a polymerization temperature of about 90° C. and a reactor pressure of about 390 psig. Additionally, in some embodiments, the activator-support can comprise sulfated alumina, fluorided silica-alumina, or fluorided silica-coated alumina, although not limited thereto.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise catalyst component I, catalyst component II, an activator, and an optional co-catalyst. Catalyst components I and II are discussed herein. For instance, catalyst component I can comprise a bridged metallocene compound having formula (A), and catalyst component II can comprise a bridged metallocene compound having formula (B).

In accordance with one embodiment of the invention, the polymerization process can employ a catalyst composition comprising catalyst component I, catalyst component II, and an activator, wherein the activator comprises an activator-support. Activator-supports useful in the polymerization processes of the present invention are disclosed herein. The catalyst composition, optionally, can further comprise one or more than one organoaluminum compound or compounds (or other suitable co-catalyst). Thus, a process for polymerizing olefins in the presence of a catalyst composition can employ a catalyst composition comprising catalyst component I, catalyst component II, an activator-support, and an organoaluminum compound. In some embodiments, the activator-support can comprise (or consist essentially of, or consist of) fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titanic, fluorided silica-coated alumina, sulfated silica-coated alumina, phosphated silica-coated alumina, and the like, or combinations thereof; or alternatively a fluorided solid oxide and/or a sulfated solid oxide. In some embodiments, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In accordance with another embodiment of the invention, the polymerization process can employ a catalyst composition comprising catalyst component I, catalyst component II, an activator-support, and an optional co-catalyst, wherein the co-catalyst can comprise an aluminoxane compound, an organoboron or organoborate compound, an ionizing ionic compound, an organoaluminum compound, an organozinc compound, an organomagnesium compound, or an organolithium compound, or any combination thereof. Hence, embodiments of this invention are directed to a process for polymerizing olefins in the presence of a catalyst composition, the processes comprising contacting a catalyst composition with an olefin monomer and optionally an olefin comonomer (one or more) in a polymerization reactor system under polymerization conditions to produce an olefin polymer, and the catalyst composition can comprise catalyst component I, catalyst component II, an activator-support, and an aluminoxane compound; alternatively, catalyst component I, catalyst component II, an activator-support, and an organoboron or organoborate compound; alternatively, catalyst component I, catalyst component II, an activator-support, and an ionizing ionic compound; alternatively, catalyst component I, catalyst component II, an activator-support, and an organoaluminum compound; alternatively, catalyst component I, catalyst component II, an activator-support, and an organozinc compound; alternatively, catalyst component I, catalyst component II, an activator-support, and an organomagnesium compound; or alternatively, catalyst component I, catalyst component II, an activator-support, and an organolithium compound. Furthermore, more than one co-catalyst can be employed, e.g., an organoaluminum compound and an aluminoxane compound, an organoaluminum compound and an ionizing ionic compound, etc.

In accordance with another embodiment of the invention, the polymerization process can employ a catalyst composition comprising only one catalyst component I metallocene compound, only one catalyst component II metallocene compound, an activator-support, and an organoaluminum compound.

In accordance with yet another embodiment of the invention, the polymerization process can employ a catalyst composition comprising catalyst component I, catalyst component II, and an activator, wherein the activator comprises an aluminoxane compound, an organoboron or organoborate compound, an ionizing ionic compound, or combinations thereof.

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain embodiments of this invention, as well as multi-reactor combinations thereof.

According to one embodiment of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment of the invention, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Embodiments of this invention are directed to olefin polymerization processes comprising contacting a catalyst composition with an olefin monomer and an optional olefin comonomer in a polymerization reactor system under polymerization conditions to produce an olefin polymer. The olefin polymer (e.g., ethylene copolymer) produced by the process can have any of the polymer properties disclosed herein.

Embodiments of this invention also are directed to olefin polymerization processes conducted in the absence of added hydrogen. An olefin polymerization process of this invention can comprise contacting a catalyst composition with an olefin monomer and optionally an olefin comonomer in a polymerization reactor system under polymerization conditions to produce an olefin polymer, wherein the catalyst composition can comprise catalyst component I, catalyst component II, an activator, and an optional co-catalyst, and wherein the polymerization process is conducted in the absence of added hydrogen (no hydrogen is added to the polymerization reactor system). As one of ordinary skill in the art would recognize, hydrogen can be generated in-situ by metallocene catalyst compositions in various olefin polymerization processes, and the amount generated can vary depending upon the specific catalyst composition and metallocene compound(s) employed, the type of polymerization process used, the polymerization reaction conditions utilized, and so forth.

In other embodiments, it may be desirable to conduct the polymerization process in the presence of a certain amount of added hydrogen. Accordingly, an olefin polymerization process of this invention can comprise contacting a catalyst composition with an olefin monomer and optionally an olefin comonomer in a polymerization reactor system under polymerization conditions to produce an olefin polymer, wherein the catalyst composition comprises catalyst component I, catalyst component II, an activator, and an optional co-catalyst, and wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled at a weight ratio which falls within a range from about 25 ppm to about 1500 ppm, from about 50 to about 1000 ppm, or from about 100 ppm to about 750 ppm.

In some embodiments of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other embodiments, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one embodiment, the olefin polymer can be an ethylene/1-butene copolymer, an ethylene/1-hexene copolymer, or an ethylene/1-octene copolymer, while in another embodiment, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the ethylene polymers of this invention, whose typical properties are provided below.

In particular embodiments and unexpectedly, the polymers disclosed herein often can have a majority of the LCB in a lower molecular weight component of the polymer (a ratio of the number of LCB of the lower molecular weight component to the number of LCB of the higher molecular weight component, per millions total carbon atoms, typically can be in a range from about 4:1 to about 100:1, or from about 5:1 to about 50:1, e.g., about 8:1, about 10:1, about 15:1, about 20:1, etc.), a majority of the SCB in a higher molecular weight component of the polymer, and a ratio of the Mp of the higher molecular weight component to the Mp of the lower molecular weight component in particular ranges. An illustrative and non-limiting example of an olefin polymer (e.g., an ethylene copolymer) consistent with embodiments of this invention can comprise a higher molecular weight component and a lower molecular weight component, and can be characterized as having the following properties: a ratio of the Mp of the higher molecular weight component to the Mp of the lower molecular weight component in a range from about 5:1 to about 100:1, a number of LCB of the lower molecular weight component in a range from about 5 to about 50 LCB per million total carbon atoms, and a number of LCB of the higher molecular weight component of less than or equal to about 5 LCB per million total carbon atoms. Another illustrative and non-limiting ethylene-based polymer described herein can have a lower molecular weight component having a Mp in a range from about 15 to about 80 kg/mol, and from about 5 to about 50 LCB per million total carbon atoms, and a higher molecular weight component having a Mp in a range from about 150 to about 800 kg/mol, and less than or equal to about 5 LCB per million total carbon atoms. Yet another illustrative and non-limiting ethylene-based polymer described herein can have a ratio of the Mp of the higher molecular weight component to the Mp of the lower molecular weight component in a range from about 5:1 to about 100:1, and a ratio of the number of LCB of the polymer to the number of LCB of the higher molecular weight component, per millions total carbon atoms, in a range from about 2:1 to about 100:1. And yet another illustrative and non-limiting ethylene-based polymer described herein can have a ratio of the Mp of the higher molecular weight component to the Mp of the lower molecular weight component in a range from about 5:1 to about 100:1, a number of LCB of the higher molecular weight component of less than or equal to about 5 LCB per million total carbon atoms, and a number of LCB of the olefin polymer in a range from about 2 to about 30 LCB per million total carbon atoms. These illustrative and non-limiting examples of olefin polymers (e.g., ethylene α-olefin copolymers) consistent with the present invention also can have any of the polymer properties listed below and in any combination.

Polymers of ethylene (homopolymer, copolymers, etc.) produced in accordance with some embodiments of this invention generally can have a melt index (MI) of less than or equal to about 2 g/10 min. Melt indices in the range from 0 to about 1 g/10 min, from 0 to about 0.4 g/10 min, or from 0 to about 0.3 g/10 min, are contemplated in other embodiments of this invention. For example, a polymer of the present invention can have a melt index in a range from 0 to about 0.25, or from 0 to about 0.2 g/10 min. In an embodiment, ethylene polymers described herein can have a high load melt index (HLMI) in a range from about 3 to about 60, from about 4 to about 30, or from about 4 to about 25 g/10 min. In another embodiment, ethylene polymers described herein can have a HLMI in a range from about 3 to about 25, from about 3 to about 20, from about 4 to about 20, from about 5 to about 18, or from about 5 to about 15 g/10 min. In particular embodiments, ethylene polymers described herein can have a ratio of HLMI/MI in a range from about 50 to about 300, from about 100 to about 350, from about 150 to about 300, from about 180 to about 350, from about 60 to about 250, from about 60 to about 200, or from about 70 to about 225.

The densities of ethylene-based polymers produced using the catalyst systems and processes disclosed herein often are less than or equal to about 0.94 g/cm$^3$. In one embodiment of this invention, the density of the ethylene polymer can be in a range from about 0.91 to about 0.94 g/cm$^3$. Yet, in another embodiment, the density can be in a range from about 0.915 to about 0.935, from about 0.913 to about 0.93, from about 0.917 to about 0.928, or from about 0.92 to about 0.928 g/cm$^3$.

In an embodiment, ethylene polymers described herein can have a ratio of Mw/Mn, or the polydispersity index, in a range from about 6 to about 50, such as, for example, from about 8 to about 35, from about 10 to about 35, or from about 12 to about 50. In another embodiment, ethylene polymers described herein can have a Mw/Mn in a range from about 14 to about 35, from about 6 to about 20, or from about 8 to about 16.

In an embodiment, ethylene polymers described herein can have a ratio of Mz/Mw in a range from about 3 to about 12. For instance, the Mz/Mw can be in a range from about 3 to about 6, from about 3.5 to about 9, or from about 3.5 to about 6.

In an embodiment, ethylene polymers described herein can have a weight-average molecular weight (Mw) in a range from about 100 to about 600, from about 175 to about 600, or from about 120 to about 500 kg/mol. Other suitable ranges for Mw can include, but are not limited to, from about 190 to about 500, from about 120 to about 300, from about 150 to about 350 kg/mol, and the like.

In an embodiment, ethylene polymers described herein can have a number-average molecular weight (Mn) in a range from about 8 to about 60, or from about 10 to about 50 kg/mol. Other suitable ranges for Mn can include, but are not limited to, from about 10 to about 25, from about 12 to about 45 kg/mol, from about 13 to about 23 kg/mol, and the like.

In an embodiment, ethylene polymers described herein can have a CY-a parameter at 190° C. in a range from about 0.2 to about 0.45, from about 0.25 to about 0.4, from about 0.25 to about 0.38, or from about 0.25 to about 0.35. Additionally or alternatively, ethylene polymers described herein can have a zero-shear viscosity at 190° C. in a range from about 10,000 to about 500,000, from about 60,000 to about 500,000, from about 20,000 to about 400,000, from about 70,000 to about 400,000, or from about 30,000 to about 300,000 Pa-sec. Additionally or alternatively, ethylene polymers described herein can have a Tau($\eta$) at 190° C. in a range from about 0.1 to about 3, from about 0.6 to about 3, from about 1 to about 3, from about 0.2 to about 2, or from about 0.4 to about 2 sec.

Ethylene copolymers, for example, produced using the polymerization processes and catalyst systems described hereinabove can, in some embodiments, have a reverse comonomer distribution, generally, the higher molecular weight components of the polymer have higher comonomer incorporation than the lower molecular weight components. Typically, there is increasing comonomer incorporation with increasing molecular weight. In one embodiment, the number of short chain branches (SCB) per 1000 total carbon atoms of the polymer can be greater at Mw than at Mn. In another embodiment, the number of SCB per 1000 total carbon atoms of the polymer can be greater at Mz than at Mw. In yet another embodiment, the number of SCB per 1000 total carbon atoms of the polymer can be greater at Mz than at Mn. In still another embodiment, a ratio of the number of SCB per 1000 total carbon atoms of the polymer at Mz to the number of SCB per 1000 total carbon atoms of the polymer at Mn can be in a range from about 1.1 to about 5, such as, for example, from about 1.2 to about 4, or from about 1.2 to about 2.5.

As described herein, olefin polymers (e.g., ethylene copolymers) can have a lower molecular weight component and a higher molecular weight component. The peak molecular weight (Mp) for the lower molecular weight component and the Mp for the higher molecular weight component are determined by deconvoluting the composite (overall polymer) molecular weight distribution (which was determined using gel permeation chromatography). As described herein, the number of long chain branches (LCB) in the lower molecular weight component and the number of LCB in the higher molecular weight component are determined by performing a polymerization experiment for each catalyst component separately (e.g., a two carbon bridged metallocene compound having formula (A) or a single atom bridged metallocene compound having formula (B)) to produce a polymer having a Mw in the 100-125 kg/mol range, and then applying the Janzen-Colby method for determining the number of LCB per million carbon atoms.

The amount of the higher molecular weight component, based on the total polymer, is not limited to any particular range. Generally, however, the amount of the higher molecular weight component can be in a range from about 10 to about 60 area %, from about 15 to about 50 area %, from about 20 to about area 55%, from about 20 to about 45 area %, or from about 20 to about area 40%, based on the amount of the total polymer, determined by deconvoluting the polymer MWD to determine the amounts of the lower molecular weight component and the higher molecular weight component.

Ethylene polymers, such as homopolymers, copolymers, etc., consistent with various embodiments of the present invention generally can have a ratio of the Mp of the higher molecular weight component to the Mp of the lower molecular weight component in a range from about 2:1 to about 100:1, or from about 5:1 to about 100:1. For instance, this ratio can be in a range from about 5:1 to about 30:1, from about 7:1 to about 50:1, from about 8:1 to about 25:1, or from about 7:1 to about 20:1.

In an embodiment, ethylene polymers described herein can have a Mp of the lower molecular weight component in a range from about 10 to about 100, from about 15 to about 80, or from about 20 to about 70 kg/mol. Other suitable ranges for Mp of the lower molecular weight component can include, but are not limited to, from about 30 to about 60, from about 18 to about 50, from about 18 to about 35 kg/mol, and the like.

In an embodiment, ethylene polymers described herein can have a Mp of the higher molecular weight component in a range from about 200 to about 1,000, from about 150 to about 800, or from about 200 to about 700 kg/mol. Other suitable ranges for Mp of the higher molecular weight component can include, but are not limited to, from about 150 to about 500 kg/mol, from about 200 to about 500 kg/mol, from about 175 to about 300 kg/mol, and the like.

Ethylene polymers consistent with various embodiments of the present invention generally can have a ratio of the number of LCB of the olefin polymer to the number of LCB of the higher molecular weight component, per million total carbon atoms, in a range from about 2:1 to about 100:1, from about 3:1 to about 50:1, or from about 2:1 to about 25:1. For instance, this ratio can be in a range from about 2:1 to about 10:1, from about 3:1 to about 15:1, from about 5:1 to about 10:1, or from about 7:1 to about 10:1.

In an embodiment, ethylene polymers described herein can have a number of LCB of the lower molecular weight component in a range from about 5 to about 100, from about 5 to about 50, from about 8 to about 30, from about 5 to about 15, or from about 5 to about 10 LCB per million total carbon atoms. Additionally or alternatively, the number of LCB of the higher molecular weight component of the polymer can be less than or equal to about 10 LCB, less than or equal to about 5 LCB, less than or equal to about 3 LCB, less than or equal to about 2 LCB, or less than or equal to about 1 LCB per million total carbon atoms. Additionally or alternatively, the number of LCB of the olefin polymer can be in a range from about 1 to about 50, from about 1 to about 30, from about 2 to about 20, from about 1 to about 10, or from about 3 to about 12 LCB per million total carbon atoms.

Articles of manufacture can be formed from, and/or can comprise, the olefin polymers (e.g., ethylene copolymers) of this invention and, accordingly, are encompassed herein. For example, articles which can comprise polymers of this invention can include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

In some embodiments, the article produced from and/or comprising a polymer of this invention is a film product. For instance, the film can be a blown film or a cast film that is produced from and/or comprises any of the olefin polymers disclosed herein. Such films also can contain one or more additives, non-limiting examples of which can include an antioxidant, an acid scavenger, an antiblock additive, a slip additive, a colorant, a filler, a processing aid, a UV inhibitor, and the like, as well as combinations thereof.

Applicants also contemplate a method for forming or preparing an article of manufacture comprising a polymer produced by any of the polymerization processes disclosed herein. For instance, a method can comprise (i) contacting a catalyst composition with an olefin monomer and an optional olefin comonomer under polymerization conditions in a polymerization reactor system to produce an olefin polymer, wherein the catalyst composition can comprise catalyst component I, catalyst component II, an activator (e.g., an activator-support comprising a solid oxide treated with an electron-withdrawing anion), and an optional co-catalyst (e.g., an organoaluminum compound); and (ii) forming an article of manufacture comprising the olefin polymer. The forming step can comprise blending, melt processing, extruding, molding, or thermoforming, and the like, including combinations thereof.

Applicants also contemplate a method for making a film (e.g., a blown film, a cast film, etc.) comprising any olefin polymer disclosed herein. For instance, the method can comprise melt processing the olefin polymer through a die to form the film. Suitably, the die can be configured based on the film to be produced, for example, an annular blown film die to produce a blown film, a slot or cast film die to produce a cast film, and so forth. Moreover, any suitable means of melt processing can be employed, although extrusion typically can be utilized. As above, additives can be combined with the polymer in the melt processing step (extrusion step), such as antioxidants, acid scavengers, antiblock additives, slip additives, colorants, fillers, processing aids, UV inhibitors, and the like, as well as combinations thereof.

Films disclosed herein, whether cast or blown, can be any thickness that is suitable for the particular end-use application, and often, the film thickness can be in a range from about 0.25 to about 250 mils, or from about 0.4 to about 100 mils. For thin film applications, typical thicknesses can be in a range from about 0.25 to about 10 mils, from about 0.4 to about 5 mils, from about 0.5 to about 2 mils, or from about 0.5 to about 1.5 mils.

In an embodiment and unexpectedly, the films disclosed herein (e.g., blown films) can have a high dart impact strength (at a low melt index). Further, such films also can have relatively high haze and shrink, and low COF properties, as compared to conventional blown films of generally the same nominal density. For instance, a blown film consistent with embodiments of this invention can comprise an olefin polymer having a melt index less than or equal to about 0.4 g/10 min, and the blown film (produced under LLDPE and/or HDPE conditions) can have a dart impact strength greater than or equal to about 300 g/mil. In some embodiments, the film (produced under LLDPE and/or HDPE conditions) can have a dart impact strength in a range from about 300 to about 2000, from about 400 to about 2000, from about 500 to about 2000, from about 600 to about 2000, or from about 700 to about 2000 g/mil.

The olefin polymer, for example, an ethylene α-olefin copolymer, used to produce such films can be further characterized by any of the polymer properties listed above and in any combination. As a non-limiting example, the olefin polymer can have a MI of less than or equal to about 0.4, less than or equal to about 0.3, less than or equal to about 0.25, or less than or equal to about 0.2 g/10 min. Additionally or alternatively, the olefin polymer can have a density from about 0.91 to about 0.94, from about 0.915 to about 0.935, from about 0.913 to about 0.93, from about 0.917 to about 0.928, or from about 0.92 to about 0.928 g/cm$^3$. Additionally or alternatively, the olefin polymer can be characterized by a HLMI in a range from about 3 to about 60, from about 4 to about 30, from about 4 to about 25, from about 4 to about 20, from about 5 to about 18, or from about 5 to about 15 g/10 min; and/or by a Mw/Mn in a range from about 6 to about 50, from about 8 to about 35, from about 10 to about 35, from about 12 to about 50, from about 14 to about 35, from about 6 to about 20, or from about 8 to about 16.

In an embodiment, film products of this invention also can be characterized by relatively high haze and relatively low coefficient of friction (COF) properties, i.e., in the absence of any additives that might impact such measurements, for example, slip and antiblock additives. Representative blown films described herein (produced under LLDPE and/or HDPE conditions) can have a film haze of greater than or equal to about 55, greater than or equal to about 65, greater than or equal to about 75, greater than or equal to about 80, or greater than or equal to about 85%, and often the film haze can range up to 95-98%. Likewise, representative blown films described herein (produced under LLDPE and/or HDPE conditions) can have a kinetic COF in a range from about 0.3 to about 0.5, from about 0.3 to about 0.48, from about 0.32 to about 0.47, or from about 0.3 to about 0.42.

In an embodiment, 1-mil blown films described herein (produced under LLDPE and/or HDPE conditions) can have a MD shrink at 250° F. in a range from about 20 to about 70, from about 35 to about 70, or from about 25 to about 65%. Other suitable ranges for MD shrink of the 1-mil film at 250° F. can include, but are not limited to, from about 27 to about 65%, from about 30 to about 60%, and the like.

In another embodiment, blown films described herein (produced under LLDPE and/or HDPE conditions) can be characterized by the MD Elmendorf tear strength. Suitable ranges can include, but are not limited to, from about 10 to about 150, from about 25 to about 150, from about 50 to about 150, or from about 75 to about 150 g/mil.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight.

High load melt index (HLMI, g/10 min) was determined in accordance with ASTM D1238 at 190° C. with a 21,600 gram weight.

Polymer density was determined in grams per cubic centimeter (g/cm$^3$) on a compression molded sample, cooled at about 15° C. per hour, and conditioned for about 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemicals Company's HDPE polyethylene resin, MARLEX® BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
$\eta_0$=zero shear viscosity;
$\tau_\eta$=viscous relaxation time (Tau(η));
a="breadth" parameter (CY-a parameter);
n=fixes the final power law slope, fixed at 2/11; and
ω=angular frequency of oscillatory shearing deformation.

Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987); each of which is incorporated herein by reference in its entirety.

The long chain branches (LCB) per 1,000,000 total carbon atoms were calculated using the method of Janzen and Colby (*J. Mol. Struct.*, 485/486, 569-584 (1999)), from values of zero shear viscosity, $\eta_0$ (determined from the Carreau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Short chain branch (SCB) content and short chain branching distribution (SCBD) across the molecular weight distribution were determined via an IR5-detected GPC system (IR5-GPC), wherein the GPC system was a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) was connected to the GPC columns via a hot-transfer line. Chromatographic data were obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a broad MWD HDPE Marlex™ BHB5003 resin (Chevron Phillips Chemical) as the broad molecular weight standard. The digital signals, on the other hand, go via a USB cable directly to Computer "B" where they are collected by a LabView data collection software provided by Polymer Char. Chromatographic conditions were set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell were set at 150° C., while the temperature of the electronics of the IR5 detector was set at 60° C. Short chain branching content was determined via an in-house method using the intensity ratio of $CH_3$ ($I_{CH3}$) to $CH_2$ ($I_{CH2}$) coupled with a calibration curve. The calibration curve was a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) were used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution were obtained for resins fractionated by the IR5-GPC system under exactly the same chromatographic conditions as for these SCB standards. A relationship between the intensity ratio and the elution volume was converted into SCB distribution as a function of MWD using a predetermined SCB calibration curve (i.e., intensity ratio of $I_{CH3}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Pilot plant polymerizations were conducted in a 23-gallon slurry loop reactor at a production rate of approximately 25 pounds of polymer per hour. Polymerization runs were carried out under continuous particle form process conditions in a loop reactor (also known as a slurry process) by contacting a dual metallocene solution in isobutane, an organoaluminum solution, and an activator-support in a 1-L stirred autoclave with continuous output to the loop reactor. The organoaluminum and dual metallocene solutions were fed as separate streams into a tee upstream of the autoclave where they contacted each other. The activator-support was flushed with isobutane into a tee between the aforementioned tee and the autoclave, contacting the organoaluminum/metallocene mixture just before entering the autoclave. The isobutane flush used to transport the activator-support into the autoclave was set at a rate that would result in a residence time of approximately 25 minutes in the autoclave. The total flow from the autoclave then entered the loop reactor.

Ethylene used was polymerization grade ethylene which was purified through a column of alumina (activated at 250° C. in nitrogen). 1-Hexene was polymerization grade 1-hexene (obtained from Chevron Phillips Chemical Company) which was purified by nitrogen purging and storage over 13-X molecular sieve activated at 250° C. (482° F.) in nitrogen. The loop reactor was a liquid full, 15.2 cm diameter, loop reactor, having a volume of 23 gallons (87 liters). Liquid isobutane was used as the diluent. Hydrogen was added to regulate the molecular weight and/or HLMI of the polymer product. The isobutane was polymerization grade isobutane (obtained from Chevron Phillips Chemical Company) that was further purified by distillation and subsequently passed through a column of alumina (activated at 250° C. in nitrogen).

Reactor conditions included a pressure around 580 psi (4 MPa), and a temperature that was varied from about 70° C. (158° F.) to about 100° C. (212° F.) as indicated in the examples. Also, the reactor was operated to have a residence time of about 1.25 hr. Metallocene concentrations in the reactor were within a range of about 1 to 2 parts per million (ppm) of the diluent in the polymerization reactor. Polymer was removed from the reactor at the rate of about 25 lb/hr and recovered in a flash chamber. A Vulcan dryer was used to dry the polymer under nitrogen at about 60-80° C.

Cocatalyst tri-isobutylaluminum (TIBA, obtained from Akzo Corporation) was also used. The cocatalyst was obtained as a one molar solution in heptane, but was further diluted to 1 weight percent. The cocatalyst was added in a concentration in a range of from about 50 to 60 parts per million of the diluent in the polymerization reactor. To prevent static buildup of the reactor, a small amount (less than 5 ppm, by weight, of diluent) of a commercial antistatic agent sold as "Stadis 450" was added as needed.

Metallocene A was rac-ethylene-bis(indenyl) zirconium dichloride, and Metallocene B was diphenylmethylidene{$\eta^5$-[3-(penten-4-yl)cyclopentadien-1-ylidene]}[$\eta^5$-(2,7-di-tert-butylfluoren-9-ylidene)] zirconium dichloride.

Fluorided silica-coated aluminas were prepared as follows. Alumina A, from W.R. Grace Company, was impregnated to incipient wetness was first calcined in dry air at about 600° C. for approximately 6 hours, cooled to ambient temperature, and then contacted with tetraethylorthosilicate in isopropanol to equal 25 wt. % $SiO_2$. After drying, the silica-coated alumina was calcined at 600° C. for 3 hours. Fluorided silica-coated alumina (7 wt. % F) was prepared by impregnating the calcined silica-coated alumina with an ammonium bifluoride solution in methanol, drying, and then calcining for 3 hours at 600° C. (unless otherwise noted) in dry air. Afterward, the fluorided silica-coated alumina was collected and stored under dry nitrogen, and was used without exposure to the atmosphere.

Some of the blown film samples were made on a laboratory-scale blown film line using typical linear low density polyethylene conditions (LLDPE) as follows: 100 mm (4 inch) die diameter, 1.5 mm (0.060 inch) die gap, 37.5 mm (1.5 inch) diameter single-screw extruder fitted with a barrier screw with a Maddock mixing section at the end (L/D=24, 2.2:1 compression ratio), about 27 kg/hr (60 lb/hr) output rate, 2.5:1 blow-up ratio (BUR), "in-pocket" bubble with a "frost line height" (FLH) of about 28 cm (11 inch), 190° C. (375° F.) barrel and die set temperatures, and 1 mil (25 micron) film and 3 mil (75 micron) film. Cooling was accomplished with a Dual Lip air ring using ambient (laboratory) air at about 25° C. (75-80° F.). These particular processing conditions were chosen because the film properties so obtained are typically representative of those obtained from larger, commercial scale film blowing conditions.

Other blown film samples were made on the same film line, but under high density polyethylene conditions (HDPE). Typically, the copolymer was blown into a 1 mil film on a 2-inch die, with a 35-mil die gap, at 205° C./220° C. barrel/die set temperatures, at a rate of 28-30 lb/hr, with a 4:1 blow-up ratio, and a 14 inch frost line height.

Dart impact strength was measured in accordance with ASTM D-1709 (method A). Machine (MD) and transverse (TD) direction Elmendorf tear strengths were measured on a Testing Machines Inc. tear tester (Model 83-11-00) in accordance with ASTM D-1922. Film haze was determined in accordance with ASTM D1003, film-to-film coefficient of friction (COF) was determined in accordance with ASTM D1894, film shrink properties were determined in accordance with ASTM D2732, and Spencer Impact was determined in accordance with ASTM D3420.

Examples 1-9

Example 1 was a broad monomodal LLDPE film resin, having a nominal 0.2 melt index and 0.924 density, commercially available from Chevron-Phillips Chemical Company LP. Each of Examples 2-9 utilized a dual catalyst system containing a two carbon bridged, zirconium based metallocene compound containing two indenyl groups (Metallocene A) and a single atom bridged, zirconium based metallocene compound containing a cyclopentadienyl and a fluorenyl group (Metallocene B).

In Example 2, bimodal polymer was produced in the reactor described above using a solution containing Metallocenes A and B at an A:B weight ratio of 8:1. The total metallocene concentration in the reactor was 0.8 ppm by weight, and the activator-support (fluorided silica-coated alumina, described above) was fed to the reactor at the rate of approximately 0.25 lb per hour, to achieve a yield of about 2000 lb polymer per lb of the fluorided silica-coated alumina. Triisobutylaluminum was fed to the reactor to maintain a concentration of 50 ppm by weight in the isobutane. 1-Hexene was added to the reactor to maintain a concentration of about 2.5 mol %, and ethylene was added to maintain a concentration of about 12 mol % (based on the isobutane diluent). About 4.5 mlb of hydrogen were added to the reactor per hour. Reactor temperature was set at 79-80° C., the reactor residence time was about 1.2 hr, and the reactor % solids were 29.4-30.3%. Examples 3-9 were produced in the same manner as Example 2, generally at 11.4-12.4 mol % ethylene and 2.5-2.9 mol % 1-hexene, and with the following different amounts of the metallocene catalysts: Example 3 (1.12 ppm of metallocenes at a 12:1 weight ratio of A:B), Example 4 (0.92 ppm of metallocenes at a 8:1 weight ratio of A:B), Example 5 (1.02 ppm of metallocenes at a 20:1 weight ratio of A:B), Example 6 (1.6 ppm of metallocenes at a 20:1 weight ratio of A:B), Example 7 (0.83 ppm of metallocenes at a 20:1 weight ratio of A:B), Example 8 (0.79 ppm of metallocenes at a 20:1 weight ratio of A:B), and Example 9 (0.66 ppm of metallocenes at a 30:1 weight ratio of A:B)

Figure 2:
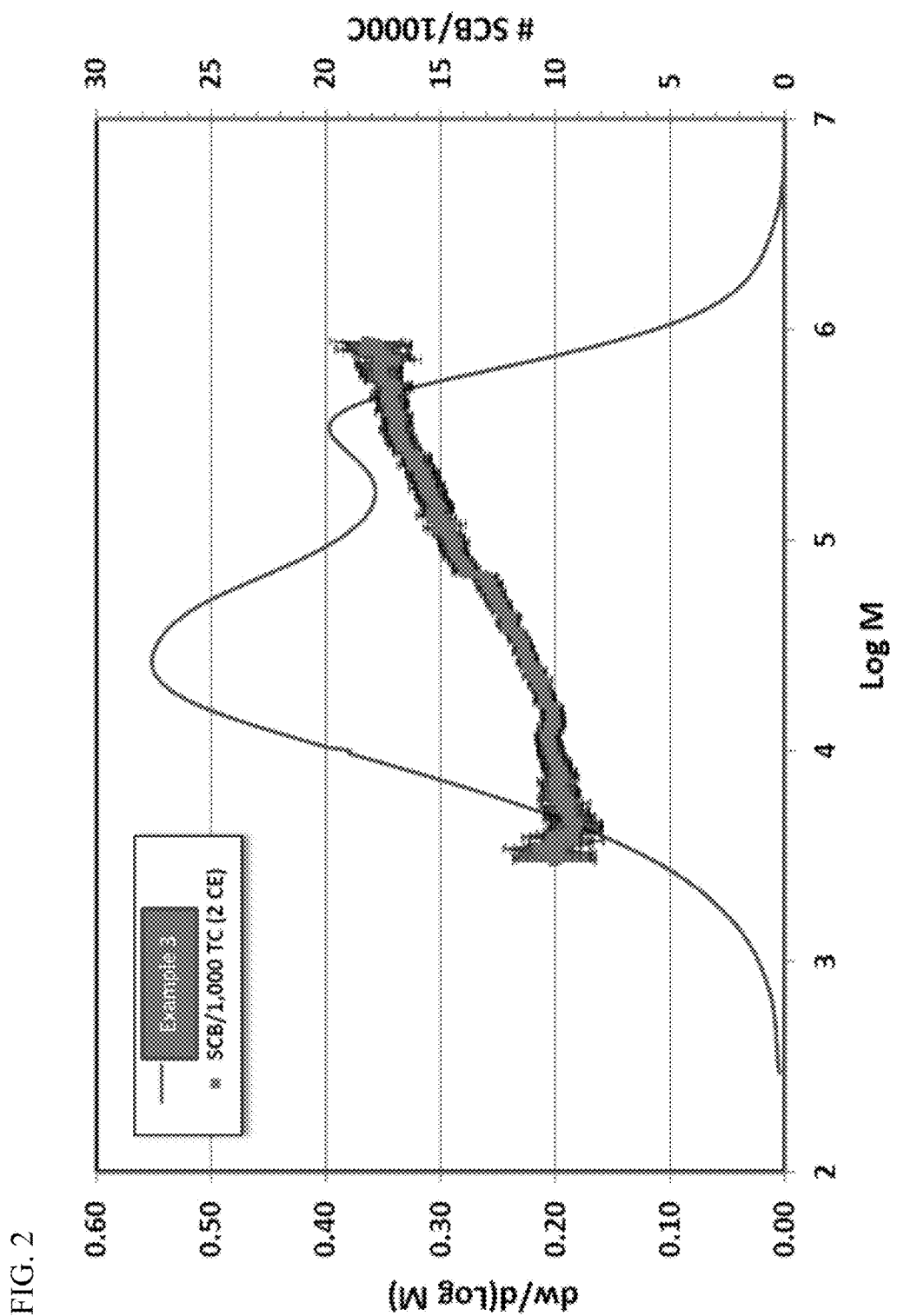
FIG. 2 presents a plot of the molecular weight distribution and short chain branch distribution of the polymer of Example 3.
Figure 3:
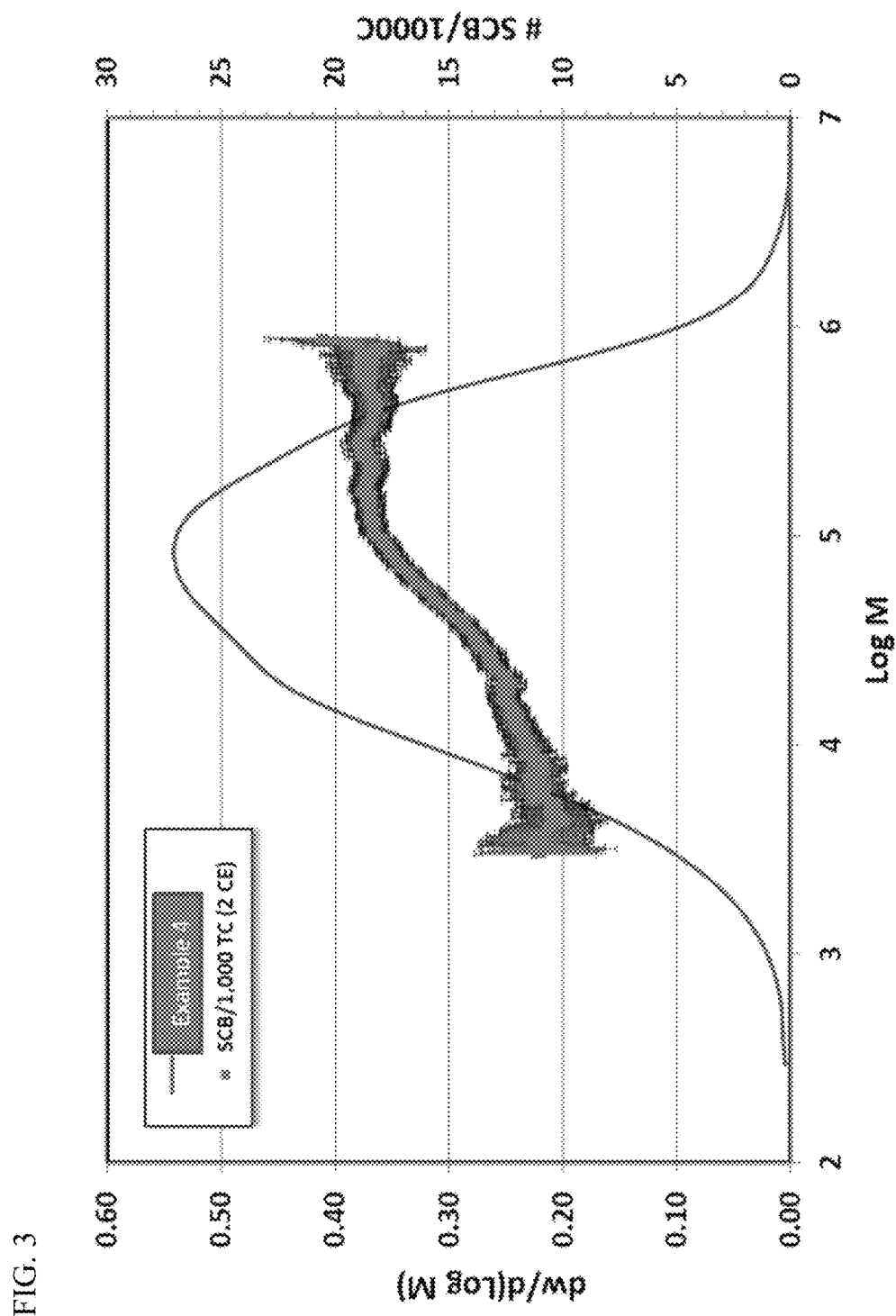
FIG. 3 presents a plot of the molecular weight distribution and short chain branch distribution of the polymer of Example 4.
Figure 4:
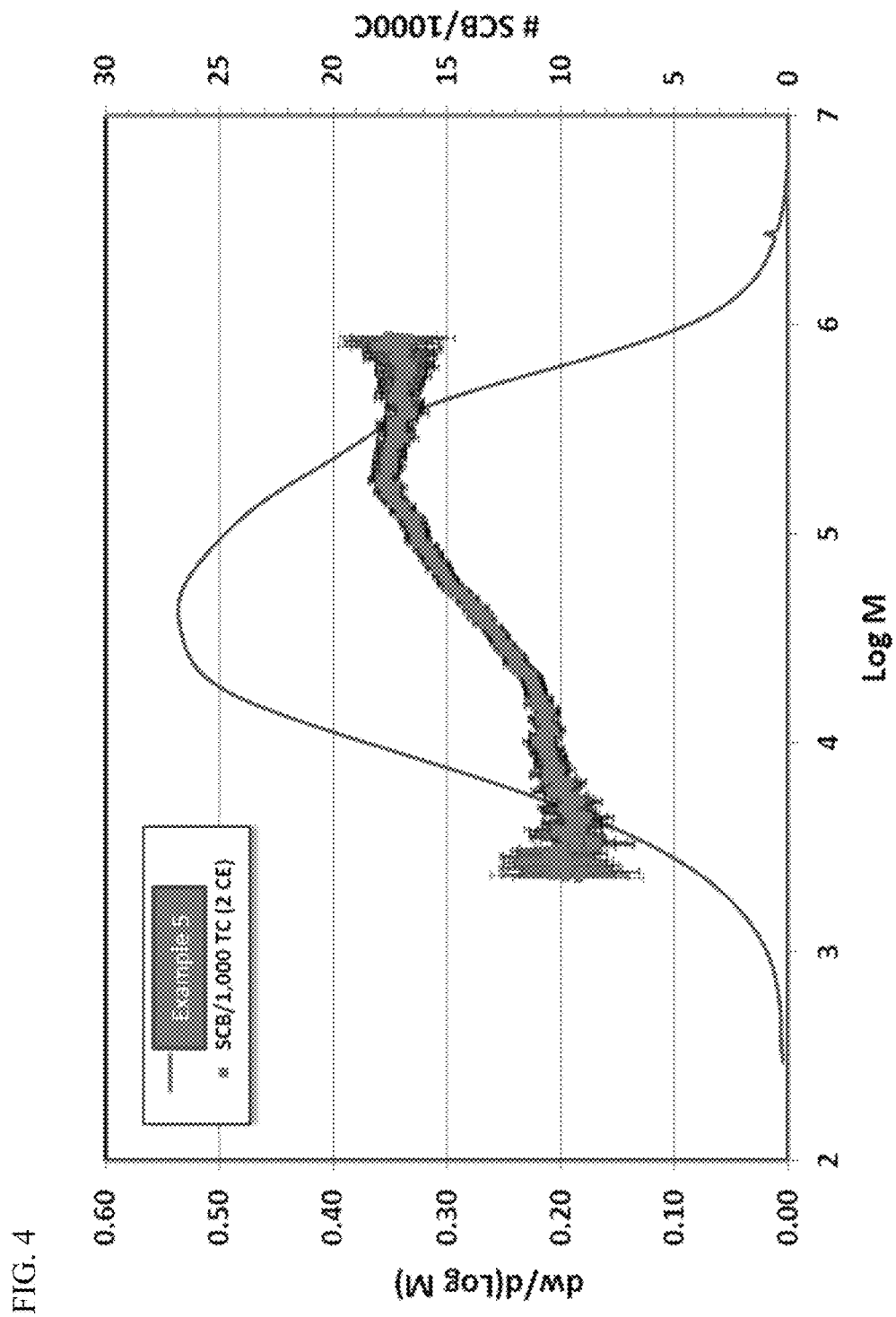
FIG. 4 presents a plot of the molecular weight distribution and short chain branch distribution of the polymer of Example 5.
Figure 5:
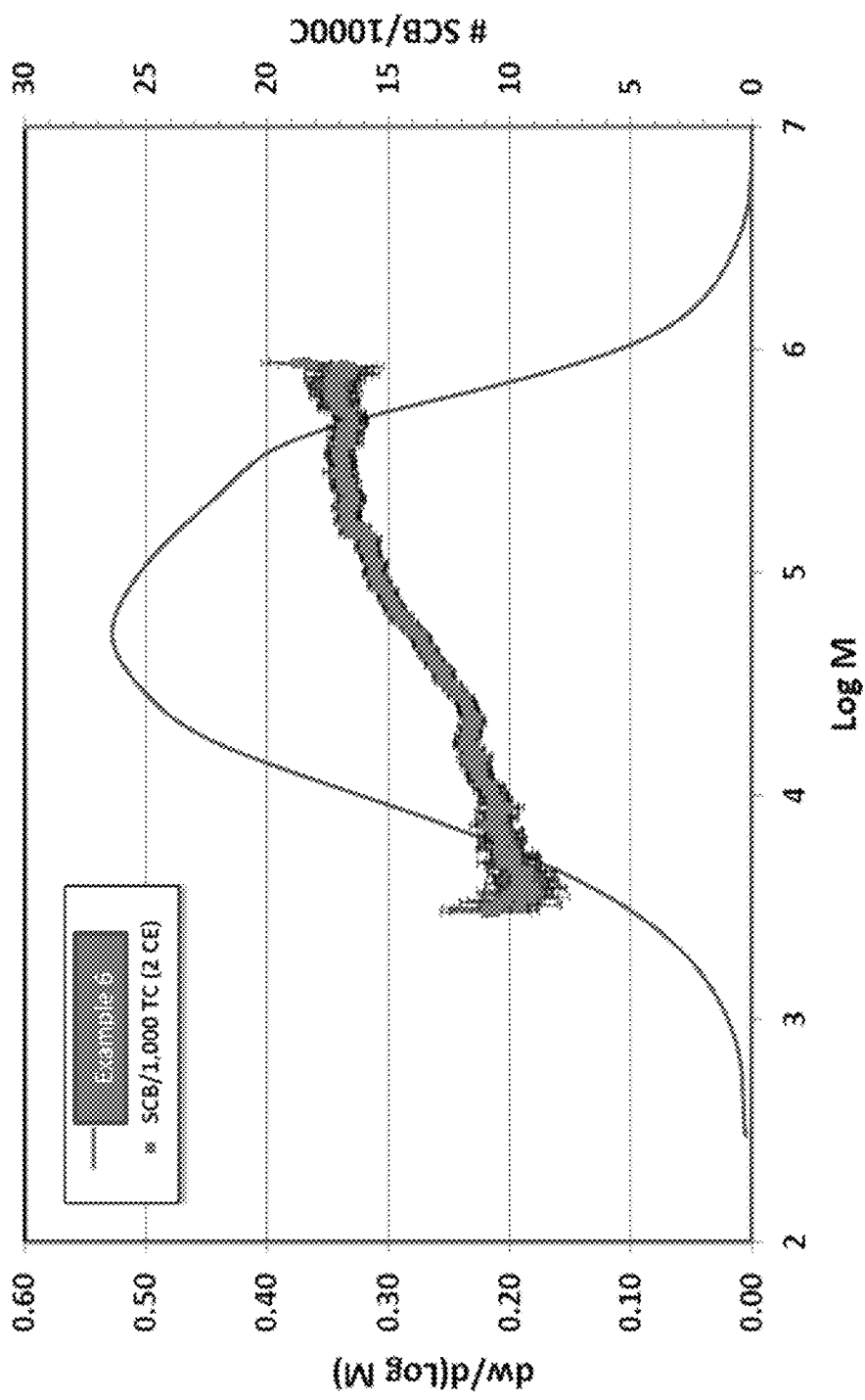
FIG. 5 presents a plot of the molecular weight distribution and short chain branch distribution of the polymer of Example 6.
Figure 6:
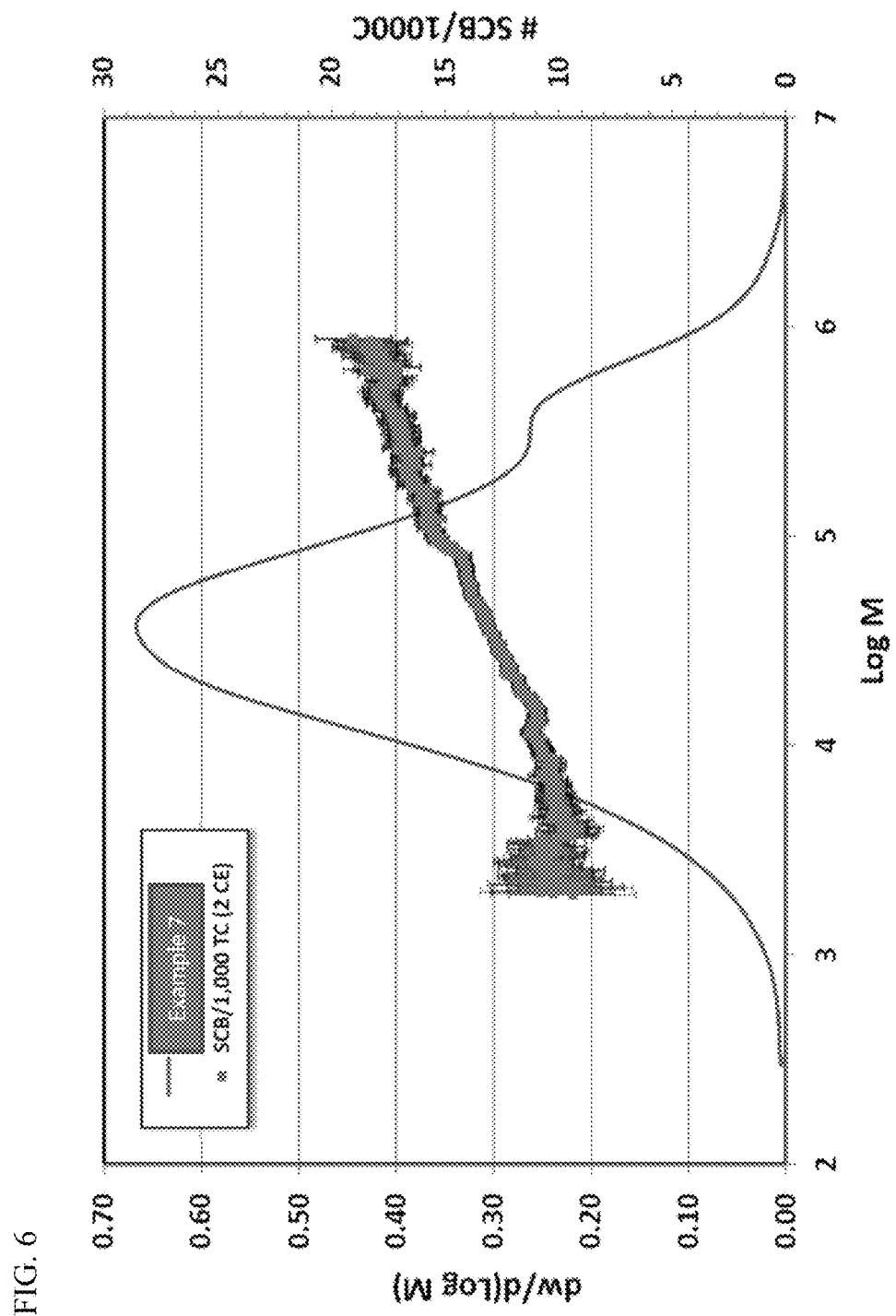
FIG. 6 presents a plot of the molecular weight distribution and short chain branch distribution of the polymer of Example 7.
Figure 7:
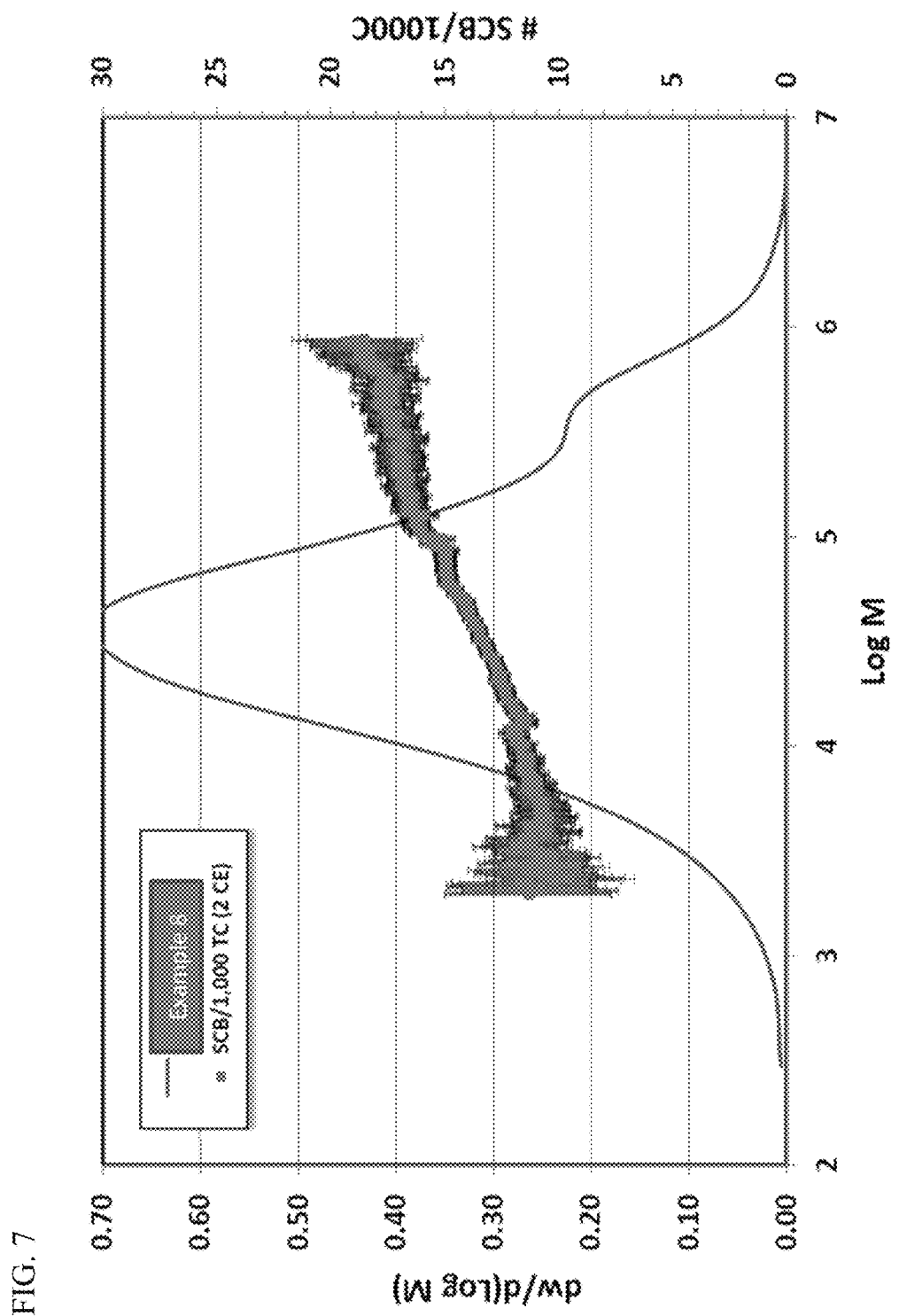
FIG. 7 presents a plot of the molecular weight distribution and short chain branch distribution of the polymer of Example 8.
Figure 8:
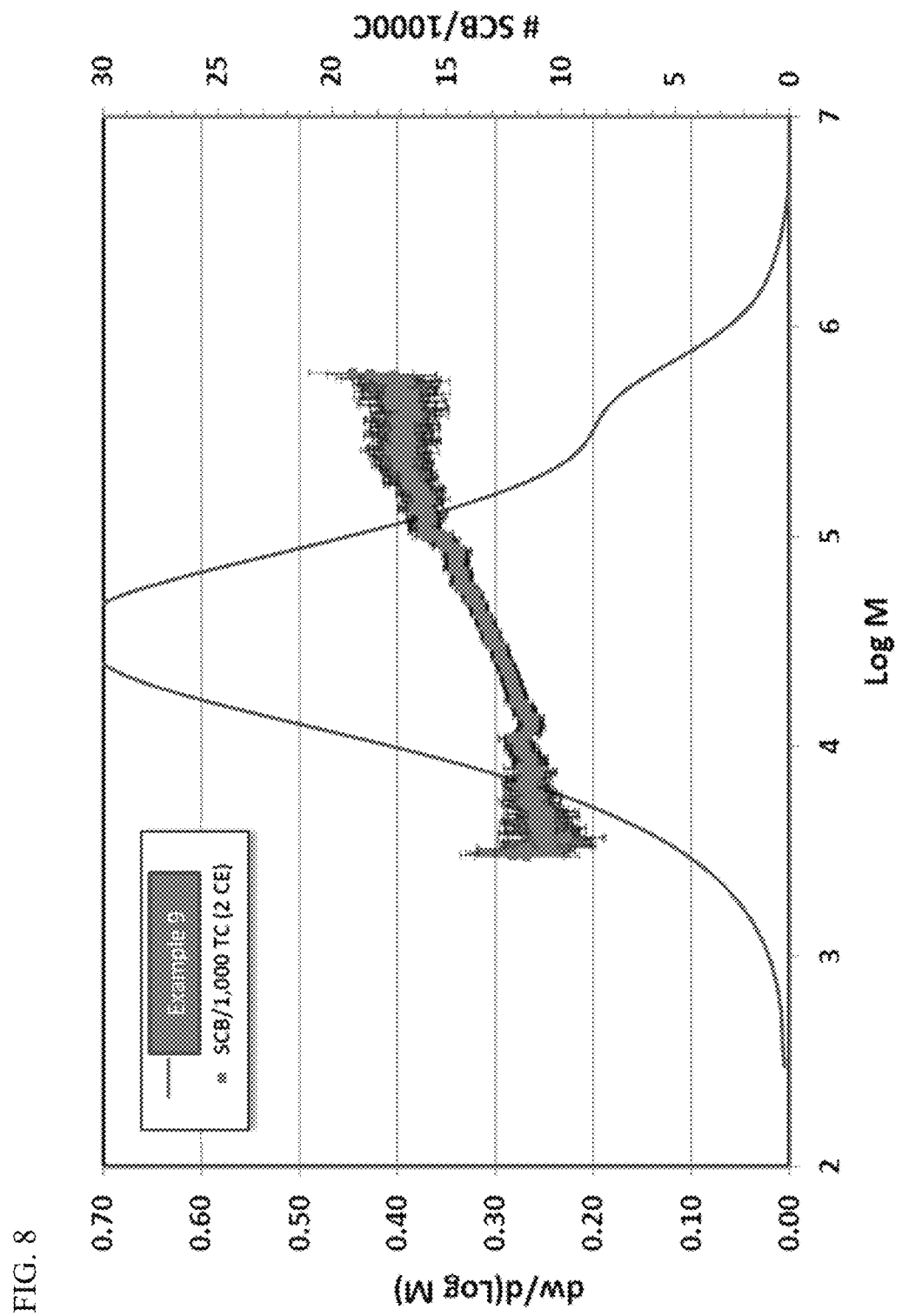
FIG. 8 presents a plot of the molecular weight distribution and short chain branch distribution of the polymer of Example 9.

Table I summarizes the polymer properties of Examples 1-9. For instance, the polymers of Examples 2-7 exhibited a unique combination of density, Mw/Mn, HLMI, LCB content, and SCB distribution. The broad molecular weight distribution and reverse comonomer distribution of the polymers produced using the dual metallocene-based catalyst systems disclosed herein are illustrated in FIGS. 1-8 for the polymers of Examples 2-9, respectively (e.g., there are relatively more short chain branches (SCB) at the higher molecular weights; assumes 2 methyl chain ends (CE)). In FIGS. 1-8, the number of SCB per 1000 total carbon (TC) atoms of the polymer at Mz (or Mw) is greater than at Mn.

Table II summarizes the properties of the lower molecular weight (LMW) component and the higher molecular weight (HMW) component of the polymers of Examples 2-8. The respective LMW and HMW component properties were determined by deconvoluting the molecular weight distribution (see FIGS. 1-8) of each polymer. The relative amounts of the LMW and HMW components (area percentages) in the polymer, and Mp of the LMW component and Mp of the HMW component, were determined using a commercial software program (Systat Software, Inc., Peak Fit™ v. 4.05). The other molecular weight parameters for the LMW and HMW components (e.g., Mn, Mw, Mz, etc., of each component) were determined by using the deconvoluted data from the Peak Fit™ program, and applying a Schulz-Flory distribution mathematical function and a Gaussian peak fit, as generally described in U.S. Pat. No. 7,300,983, which is incorporated herein by reference in its entirety. The ratios of the Mp of the HMW component to the Mp of the LMW component for the polymers of Examples 2-8 were in the 7:1 to 15:1 range.

The LCB of the polymers of Examples 2-9 were determined using Janzen-Colby method, as described herein. The LCB of the HMW component was determined by first producing a polymer using Metallocene B alone at conditions suitable to produce a polymer having a molecular weight (Mw) in the 100-125 kg/mol range, and then determining the LCB content using the Janzen-Colby method. The LCB of the LMW component was likewise determined by first producing a polymer using Metallocene A alone at conditions suitable to produce a polymer having a Mw in the 100-125 kg/mol range, and then determining the LCB content using the Janzen-Colby method. The polymerization runs used to produce these polymers were conducted in a one-gallon stainless steel reactor with 1.8 L of isobutane. About 1 mmol triisobutylaluminum, 100 mg of fluorided silica-coated alumina, and 3 mg of the respective metallocene compound were added in that order through a charge port while slowly venting isobutane vapor. The charge port was closed and isobutane was added. The contents of the reactor were stirred and heated to the polymerization temperature of 80° C., and ethylene and 40 mL of 1-hexene were then introduced into the reactor. Ethylene was fed on demand to maintain the target pressure of 400 psig pressure for the 30 min length of the polymerization run. If needed, hydrogen was added with the ethylene feed to produce a polymer with a Mw in the 100-125 kg/mol range. The reactor was maintained at the desired temperature throughout the run by an automated heating-cooling system. Using Metallocene A, polymers were produced at a Mw of 110 kg/mol and at a Mw of 112 kg/mol, and these polymers had 12.4 and 12.3 LCB, respectively, per million carbon atoms. Using Metallocene B, polymers were produced at a Mw of 107 kg/mol and at 122 kg/mol, and both polymers had 1.1 LCB per million carbon atoms. Hence, the ratio of the number of LCB of the LMW component to the number of LCB of the HMW component, per million total carbon atoms, was about 11:1.

Blown films were produced under the HDPE conditions provided hereinabove at an output rate of 28-30 lb/hr and a melt temperature of 191-192° C. In Table III, blown films labeled with an "A" were made without a polymer processing aid (e.g., Example 3A), while those labeled with a "B" were made with 400-800 ppm of a polymer processing aid (e.g., Example 3B). Gels were measured using an automated camera-based gel counting machine made by Optical Control System (OCS), Model FS-5. The system consisted of a light source and a detector. The film was passed through the system, between the light source and the detector, with a 150 mm (6 inch) inspection width. A total of 10 square meters of film area was inspected and the gels with sizes less than or greater than 200 microns were analyzed. The numbers in the table represent the numbers of each category of gel sizes counted per square foot. Films made from the polymers of Examples 2-6, as shown in Table III, exhibited a unique combination of dart impact strength, MD tear strength, haze, COF, and shrink properties. In particular, the films made from the polymers of Examples 2-6 had dart impact strengths 3-7 times greater than that of the film produced from the polymer of Example 1, as well as a better balance of MD tear strength and TD tear strength.

Blown films were produced under the LLDPE conditions provided hereinabove at an output rate of about 27 kg/hr (60 lb/hr) and a melt temperature of 179-184° C., except for Example 2, which was produced at an output rate of 45-48 lb/hr due to pressure limitations. In Tables IV-V, blown films with an "A" were made without a polymer processing aid (e.g., Example 3A), while those with a "B" were made with 400-800 ppm of a polymer processing aid (e.g., Example 3B). Films made from the polymers of Examples 2-8, as shown in Table IV, exhibited a unique combination of dart impact strength, MD tear strength, haze, COF, and shrink properties. In particular, the films made from the polymers of Examples 2-8 had lower gels and higher dart impact strengths than that of the film produced from the polymer of Example 1, as well as a better balance of MD tear strength and TD tear strength.

TABLE I

Polymer Properties of Examples 1-9.

|  | 1 | 2 | 3 | 4 | 5 | 6 | 7 | 8 | 9 |
|---|---|---|---|---|---|---|---|---|---|
| Melt Index | 0.16 | 0.04 | 0.08 | 0.14 | 0.18 | 0.07 | 0.31 | 0.57 | 1.01 |
| HLMI | 15.9 | 5.1 | 12.7 | 9.6 | 15.7 | 6.7 | 24.0 | 59.6 | 92.9 |
| HLMI/MI | 99 | 128 | 159 | 69 | 87 | 95 | 77 | 105 | 92 |
| Density | 0.9246 | 0.9223 | 0.9242 | 0.9189 | 0.9220 | 0.9219 | 0.9249 | 0.9243 | 0.9252 |
| Molecular weight parameters (kg/mol) | | | | | | | | | |
| Mn | 11.6 | 16.6 | 16.1 | 17.5 | 15.7 | 17.3 | 14.1 | 14.4 | 14.7 |
| Mw | 181 | 214 | 189 | 181 | 167 | 192 | 149 | 138 | 123 |

TABLE I-continued

Polymer Properties of Examples 1-9.

|  | 1 | 2 | 3 | 4 | 5 | 6 | 7 | 8 | 9 |
|---|---|---|---|---|---|---|---|---|---|
| Mz | 896 | 759 | 764 | 644 | 657 | 72 | 727 | 729 | 673 |
| Mw/Mn | 15.6 | 12.9 | 11.7 | 10.3 | 10.7 | 11.1 | 10.6 | 9.6 | 8.4 |
| Mz/Mw | 5.0 | 3.5 | 4.1 | 3.6 | 3.9 | 3.8 | 4.9 | 5.3 | 5.5 |
| Mp | 77.5 | 26.2 | 28.0 | 120.4 | 55.1 | 55.1 | 36.6 | 37.6 | 36.6 |
| Dynamic Rheology @ 190° C. | | | | | | | | | |
| $\eta_0$ (Pa-sec) | 6.3E+05 | 1.5E+05 | 1.0E+05 | 7.4E+04 | 8.2E+04 | 1.7E+05 | 6.3E+04 | 4.3E+04 | 3.4E+04 |
| Tau($\eta$) (sec) | 2.30 | 1.33 | 1.11 | 0.41 | 0.52 | 1.18 | 0.54 | 0.27 | 0.12 |
| CY-a | 0.176 | 0.415 | 0.385 | 0.330 | 0.290 | 0.300 | 0.250 | 0.228 | 0.193 |
| LCB content (per 1,000,000 carbon atoms) and SCB distribution (SCBD) | | | | | | | | | |
| LCB content | 12.7 | 3.7 | 3.6 | 3.3 | 4.5 | 4.6 | 7.4 | 7.4 | 10.1 |
| SCBD | reverse | reverse | reverse | reverse | reverse | reverse | reverse | reverse | reverse |

TABLE II

Lower Molecular Weight and Higher Molecular Weight Component Properties of Examples 2-8.

| | Lower Molecular Component Properties (kg/mol) | | | | | | | Higher Molecular Weight Component Properties (kg/mol) | | | | | | | Mp(HMW)/ |
|---|---|---|---|---|---|---|---|---|---|---|---|---|---|---|---|
| | % | Mn | Mw | Mz | Mp | Mw/Mn | Mz/Mw | % | Mn | Mw | Mz | Mp | Mw/Mn | Mz/Mw | Mp(LMW) |
| 2 | 54 | 10.5 | 38.4 | 113.7 | 20.1 | 3.7 | 3.0 | 46 | 164.4 | 406.1 | 736.7 | 258.4 | 2.5 | 1.8 | 13 |
| 3 | 62 | 10.8 | 39.8 | 111.5 | 20.8 | 3.7 | 2.8 | 38 | 178.0 | 424.8 | 762.9 | 275.0 | 2.4 | 1.8 | 13 |
| 4 | 45 | 11.0 | 45.2 | 185.9 | 22.3 | 4.1 | 4.1 | 55 | 99.6 | 438.7 | 746.4 | 186.4 | 4.4 | 1.7 | 8 |
| 5 | 58 | 11.4 | 46.6 | 115.0 | 23.0 | 4.1 | 2.5 | 42 | 120.8 | 362.5 | 715.4 | 209.3 | 3.0 | 2.0 | 9 |
| 6 | 56 | 9.4 | 52.3 | 213.0 | 22.1 | 5.6 | 4.1 | 44 | 116.9 | 367.7 | 780.6 | 267.3 | 3.1 | 2.1 | 12 |
| 7 | 72 | 12.8 | 47.6 | 133.1 | 24.7 | 3.7 | 2.8 | 28 | 123.7 | 417.8 | 831.5 | 227.3 | 3.4 | 2.0 | 9 |
| 8 | 75 | 15.3 | 58.3 | 134.2 | 29.9 | 3.8 | 2.3 | 25 | 151.1 | 453.2 | 812.1 | 261.6 | 3.0 | 1.8 | 9 |

TABLE III

Film Properties of Examples 1-6 at 1 mil - HDPE processing conditions.

| HDPE | 1 | 2A | 2B | 3A | 3B | 4A | 4B | 5B | 6A | 6B |
|---|---|---|---|---|---|---|---|---|---|---|
| Gels <200 μm | 289 | 82 | 120 | 93 | 80 | 121 | 197 | 433 | 83 | 119 |
| Gels >200 μm | 49 | 49 | 141 | 40 | 42 | 46 | 75 | 121 | 32 | 54 |
| Dart Impact (g) | 173 | 1003 | 936 | 965 | 741 | 1274 | 1128 | 861 | 634 | 978 |
| MD Tear (g) | 41 | 111 | 84 | 108 | 85 | 121 | 91 | 107 | 99 | 82 |
| TD Tear (g) | 473 | 206 | 232 | 310 | 257 | 333 | 296 | 288 | 243 | 249 |
| Haze, % | 43.5 | 86.0 | 85.8 | 83.3 | 84.7 | 68.2 | 66.9 | 69.4 | 78.7 | 80.4 |
| Spencer Impact (J) | 0.51 | 1.94 | 1.91 | 1.88 | 1.85 | 1.86 | 1.85 | 1.82 | 1.86 | 1.87 |
| Kinetic COF (in/in) | 0.315 | 0.350 | 0.331 | 0.345 | 0.341 | 0.379 | 0.410 | 0.381 | 0.364 | 0378 |
| Static COF (in/in) | 0.334 | 0.401 | 0.378 | 0.438 | 0.416 | 0.480 | 0.464 | 0.441 | 0.401 | 0.440 |
| Oil Shrinkage at 250 F. | | | | | | | | | | |
| MD (%) | 35 | 53 | 53 | 45 | 57 | 52 | 42 | 43 | 40 | 35 |
| TD (%) | 27 | 45 | 42 | 40 | 40 | 42 | 28 | 33 | 27 | 23 |
| Oil Shrinkage at 275 F. | | | | | | | | | | |
| MD (%) | 73 | 65 | 67 | 68 | 65 | 58 | 58 | 67 | 65 | 62 |
| TD (%) | 43 | 55 | 48 | 48 | 45 | 43 | 40 | 52 | 47 | 47 |
| Oil Shrinkage at 300 F. | | | | | | | | | | |
| MD (%) | 80 | 72 | 75 | 70 | 70 | 70 | 70 | 75 | 70 | 70 |
| TD (%) | 43 | 52 | 50 | 50 | 50 | 48 | 45 | 45 | 52 | 47 |

TABLE IV

Film Properties of Examples 1-8 at 1 mil - LLDPE processing conditions.

| LLDPE | 1 | 2A | 2B | 3A | 3B | 4A | 4B | 5B | 6A | 6B | 7B | 8A |
|---|---|---|---|---|---|---|---|---|---|---|---|---|
| Gels <200 μm | 87 | 84 | 3 | 3 | 3 | 35 | 2 | 63 | 6 | 2 | 33 | 21 |
| Gels >200 μm | 43 | 55 | 2 | 1 | 2 | 11 | 2 | 27 | 2 | 1 | 17 | 6 |
| Dart Impact (g) | 53 | 513 | 984 | 378 | 603 | 1285 | 1376 | 685 | 1305 | 1225 | 120 | 109 |
| MD Tear (g) | 35 | 23 | 67 | 40 | 75 | 63 | 97 | 74 | 89 | 62 | 82 | 112 |
| TD Tear (g) | 817 | 678 | 752 | 855 | 874 | 543 | 634 | 688 | 518 | 674 | 466 | 419 |
| Haze, % | 42.1 | 91.3 | 94.1 | 91.9 | 91.0 | 75.6 | 68.9 | 75.3 | 85.7 | 86.1 | 85.9 | 77.9 |
| Spencer Impact (J) | 1.12 | 1.90 | 1.93 | 1.88 | 1.92 | 1.90 | 1.91 | 1.90 | 1.92 | 1.93 | 0.39 | 0.39 |
| Kinetic COF (in/in) | 0.328 | 0.338 | 0.340 | 0.336 | 0.343 | 0.398 | 0.372 | 0.373 | 0.347 | 0.353 | 0.346 | 0.372 |
| Static COF (in/in) | 0.352 | 0.408 | 0.393 | 0.406 | 0.427 | 0.425 | 0.453 | 0.451 | 0.393 | 0.404 | 0.391 | 0.448 |
| Oil Shrinkage at 250 F. | | | | | | | | | | | | |
| MD (%) | 20 | 33 | 33 | 42 | 38 | 57 | 48 | 38 | 35 | 27 | 25 | 30 |
| TD (%) | 8 | 15 | 13 | 13 | 17 | 13 | 12 | 12 | 15 | 13 | 12 | 13 |
| Oil Shrinkage at 275 F. | | | | | | | | | | | | |
| MD (%) | 80 | 80 | 70 | 72 | 75 | 77 | 77 | 73 | 70 | 75 | 75 | 70 |
| TD (%) | 13 | 3 | 13 | 25 | 13 | 10 | 20 | 8 | 28 | 13 | 13 | 13 |
| Oil Shrinkage at 300 F. | | | | | | | | | | | | |
| MD (%) | 84 | 80 | 80 | 77 | 80 | 80 | 80 | 75 | 80 | 80 | 80 | 80 |
| TD (%) | 10 | 15 | 20 | 13 | 15 | 15 | 20 | 15 | 30 | 15 | 20 | 15 |

TABLE V

Film Properties of Examples 1-8 at 3 mils - LLDPE processing conditions.

| LLDPE | 1 | 2A | 2B | 3A | 3B | 4A | 4B | 5B | 6A | 6B | 7B | 8A |
|---|---|---|---|---|---|---|---|---|---|---|---|---|
| Dart Impact (g) | 253 | >1400 | >1400 | >1400 | >1400 | >1400 | >1400 | >1400 | >1400 | >1400 | 107 | 353 |
| MD Tear (g) | 255 | 284 | 415 | 433 | 514 | 520 | 516 | 565 | 487 | 384 | 433 | 652 |
| TD Tear (g) | 1792 | 1201 | 1260 | 1346 | 1293 | 1127 | 1100 | 1282 | 1165 | 1100 | 900 | 1201 |
| Haze, % | 47.6 | 95.4 | 95.4 | 91.2 | 89.8 | 79.2 | 72.9 | 71.2 | 88.7 | 88.2 | 82.4 | 76.1 |
| Spencer Impact (J) | 1.29 | 2.18 | 2.20 | 2.20 | 2.19 | 2.17 | 2.15 | 2.18 | 2.18 | 2.16 | 0.84 | 0.88 |
| Kinetic COF (in/in) | 0.317 | 0.327 | 0.335 | 0.327 | 0.327 | 0.365 | 0.373 | 0.354 | 0.332 | 0.349 | 0.335 | 0.347 |
| Static COF (in/in) | 0.323 | 0.396 | 0.464 | 0.457 | 0.448 | 0.466 | 0.496 | 0.463 | 0.425 | 0.425 | 0.407 | 0.479 |
| Oil Shrinkage at 250 F. | | | | | | | | | | | | |
| MD (%) | 10 | 40 | 25 | 13 | 20 | 15 | 12 | 18 | 18 | 28 | 40 | 20 |
| TD (%) | 5 | 13 | 12 | 3 | 3 | 5 | 10 | 13 | 8 | 15 | 8 | 8 |
| Oil Shrinkage at 275 F. | | | | | | | | | | | | |
| MD (%) | 52 | 53 | 55 | 63 | 62 | 58 | 65 | 60 | 55 | 60 | 65 | 53 |
| TD (%) | 15 | 13 | 10 | 15 | 20 | 15 | 15 | 15 | 18 | 13 | 12 | 15 |
| Oil Shrinkage at 300 F. | | | | | | | | | | | | |
| MD (%) | 75 | 70 | 65 | 65 | 65 | 65 | 70 | 70 | 70 | 70 | 70 | 57 |
| TD (%) | 15 | 25 | 25 | 15 | 25 | 15 | 20 | 20 | 20 | 17 | 15 | 20 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. An olefin polymer comprising a higher molecular weight component and a lower molecular weight component, wherein the olefin polymer has:
a ratio of the Mp of the higher molecular weight component to the Mp of the lower molecular weight component in a range from about 5:1 to about 100:1;
a number of LCB of the lower molecular weight component in a range from about 5 to about 50 LCB per million total carbon atoms; and
a number of LCB of the higher molecular weight component of less than or equal to about 5 LCB per million total carbon atoms.

Embodiment 2. An olefin polymer comprising a higher molecular weight component and a lower molecular weight component, wherein:
the lower molecular weight component has a Mp in a range from about 15 to about 80 kg/mol, and from about 5 to about 50 LCB per million total carbon atoms; and the higher molecular weight component has a Mp in a range from about 150 to about 800 kg/mol, and less than or equal to about 5 LCB per million total carbon atoms.

Embodiment 3. An olefin polymer comprising a higher molecular weight component and a lower molecular weight component, wherein the olefin polymer has:
a ratio of the Mp of the higher molecular weight component to the Mp of the lower molecular weight component in a range from about 5:1 to about 100:1; and
a ratio of the number of LCB of the olefin polymer to the number of LCB of the higher molecular weight component, per millions total carbon atoms, in a range from about 2:1 to about 100:1.

Embodiment 4. An olefin polymer comprising a higher molecular weight component and a lower molecular weight component, wherein the olefin polymer has:
a ratio of the Mp of the higher molecular weight component to the Mp of the lower molecular weight component in a range from about 5:1 to about 100:1;
a number of LCB of the higher molecular weight component of less than or equal to about 5 LCB per million total carbon atoms; and
a number of LCB of the olefin polymer in a range from about 2 to about 30 LCB per million total carbon atoms.

Embodiment 5. The olefin polymer defined in any one of embodiments 1-4, wherein an amount of the higher molecular weight component, based on the total polymer, is in any range of area percentages disclosed herein, e.g., from about 10 to about 60%, from about 15 to about 50%, from about 20 to about 55%, from about 20 to about 45%, from about 20 to about 40%, etc.

Embodiment 6. The olefin polymer defined in any one of embodiments 1-5, wherein a ratio of the Mp of the higher molecular weight component to the Mp of the lower molecular weight component is any range disclosed herein, e.g., from about 2:1 to about 100:1, from about 5:1 to about 100:1, from about 5:1 to about 30:1, from about 7:1 to about 50:1, from about 8:1 to about 25:1, etc.

Embodiment 7. The olefin polymer defined in any one of embodiments 1-6, wherein the lower molecular weight component has a Mp in any range disclosed herein, e.g., from about 10 to about 100, from about 15 to about 80, from about 20 to about 70, from about 30 to about 60, from about 18 to about 50, from about 18 to about 35 kg/mol, etc.

Embodiment 8. The olefin polymer defined in any one of embodiments 1-7, wherein the higher molecular weight component has a Mp in any range disclosed herein, e.g., from about 200 to about 1,000, from about 150 to about 800, from about 200 to about 700, from about 150 to about 500, from about 250 to about 500, from about 175 to about 300 kg/mol, etc.

Embodiment 9. The olefin polymer defined in any one of embodiments 1-8, wherein a ratio of the number of LCB of the olefin polymer to the number of LCB of the higher molecular weight component, per million total carbon atoms, is any range disclosed herein, e.g., from about 2:1 to about 100:1, from about 3:1 to about 50:1, from about 2:1 to about 25:1, from about 2:1 to about 10:1, from about 3:1 to about 15:1, from about 5:1 to about 10:1, from about 7:1 to about 10:1, etc.

Embodiment 10. The olefin polymer defined in any one of embodiments 1-9, wherein a number of LCB of the lower molecular weight component is in any range disclosed herein, e.g., from about 5 to about 100, from about 5 to about 50, from about 8 to about 30, from about 5 to about 15, from about 5 to about 10 LCB per million total carbon atoms, etc.

Embodiment 11. The olefin polymer defined in any one of embodiments 1-10, wherein a number of LCB of the higher molecular weight component is any range disclosed herein, less than or equal to about 10 LCB, less than or equal to about 5 LCB, less than or equal to about 3 LCB, less than or equal to about 2 LCB, less than or equal to about 1 LCB per million total carbon atoms, etc.

Embodiment 12. The olefin polymer defined in any one of embodiments 1-11, wherein a number of LCB of the olefin polymer is in any range disclosed herein, e.g., from about 1 to about 50, from about 1 to about 30, from about 2 to about 20, from about 1 to about 10, from about 3 to about 12 LCB per million total carbon atoms, etc.

Embodiment 13. The olefin polymer defined in any one of embodiments 1-12, wherein the olefin polymer has a density in any range disclosed herein, e.g., from about 0.91 to about 0.94, from about 0.915 to about 0.935, from about 0.913 to about 0.93, from about 0.917 to about 0.928, from about 0.92 to about 0.928 g/cm$^3$, etc.

Embodiment 14. The olefin polymer defined in any one of embodiments 1-13, wherein the olefin polymer has a melt index in any range disclosed herein, e.g., less than or equal to about 1, less than or equal to about 0.4, less than or equal to about 0.3, less than or equal to about 0.25, less than or equal to about 0.2 g/10 min, etc.

Embodiment 15. The olefin polymer defined in any one of embodiments 1-14, wherein the olefin polymer has a HLMI in any range disclosed herein, e.g., from about 3 to about 60, from about 4 to about 30, from about 4 to about 25, from about 4 to about 20, from about 5 to about 18, from about 5 to about 15 g/10 min, etc.

Embodiment 16. The olefin polymer defined in any one of embodiments 1-15, wherein the olefin polymer has a ratio of HLMI/MI in any range disclosed herein, e.g., from about 50 to about 300, from about 100 to about 350, from about 150 to about 300, from about 180 to about 350, from about 60 to about 250, from about 60 to about 200, from about 70 to about 225, etc.

Embodiment 17. The olefin polymer defined in any one of embodiments 1-16, wherein the olefin polymer has a ratio of Mw/Mn in any range disclosed herein, e.g., from about 6 to about 50, from about 8 to about 35, from about 10 to about 35, from about 12 to about 50, from about 14 to about 35, from about 6 to about 20, from about 8 to about 16, etc.

Embodiment 18. The olefin polymer defined in any one of embodiments 1-17, wherein the olefin polymer has a ratio of Mz/Mw in any range disclosed herein, e.g., from about 3 to about 12, from about 3 to about 6, from about 3.5 to about 9, from about 3.5 to about 6, etc.

Embodiment 19. The olefin polymer defined in any one of embodiments 1-18, wherein the olefin polymer has a Mw in any range disclosed herein, e.g., from about 100 to about 600, from about 175 to about 600, from about 120 to about 500, from about 190 to about 500, from about 120 to about 300, from about 150 to about 350 kg/mol, etc.

Embodiment 20. The olefin polymer defined in any one of embodiments 1-19, wherein the olefin polymer has a Mn in any range disclosed herein, e.g., from about 8 to about 60, from about 10 to about 50, from about 10 to about 25, from about 12 to about 45 kg/mol, etc.

Embodiment 21. The olefin polymer defined in any one of embodiments 1-20, wherein the olefin polymer has a CY-a parameter in any range disclosed herein, e.g., from about 0.2 to about 0.45, from about 0.25 to about 0.4, from about 0.25 to about 0.38, from about 0.25 to about 0.35, etc.

Embodiment 22. The olefin polymer defined in any one of embodiments 1-21, wherein the olefin polymer has a zero-shear viscosity in any range disclosed herein, e.g., from about 10,000 to about 500,000, from about 60,000 to about 500,000, from about 20,000 to about 400,000, from about 70,000 to about 400,000, from about 30,000 to about 300,000 Pa-sec, etc.

Embodiment 23. The polymer defined in any one of embodiments 1-22, wherein the olefin polymer has a Tau(η) in any range disclosed herein, e.g., from about 0.1 to about 3, from about 0.6 to about 3, from about 1 to about 3, from about 0.2 to about 2, from about 0.4 to about 2 sec, etc.

Embodiment 24. The olefin polymer defined in any one of embodiments 1-23, wherein the olefin polymer has a reverse comonomer distribution, e.g., the number of SCB per 1000 total carbon atoms of the polymer at Mw is greater than at Mn, and/or the number of SCB per 1000 total carbon atoms of the polymer at Mz is greater than at Mw, and/or the number of SCB per 1000 total carbon atoms of the polymer at Mz is greater than at Mn.

Embodiment 25. The olefin polymer defined in any one of embodiments 1-24, wherein a ratio of the number of SCB per 1000 total carbon atoms of the polymer at Mz to the number of SCB per 1000 total carbon atoms of the polymer at Mn is in any range disclosed herein, e.g., from about 1.1 to about 5, from about 1.2 to about 4, from about 1.2 to about 2.5, etc.

Embodiment 26. The olefin polymer defined in any one of embodiments 1-25, wherein the olefin polymer is an ethylene/α-olefin copolymer.

Embodiment 27. The olefin polymer defined in any one of embodiments 1-26, wherein the olefin polymer is an ethylene/1-butene copolymer, an ethylene/1-hexene copolymer, or an ethylene/1-octene copolymer.

Embodiment 28. The olefin polymer defined in any one of embodiments 1-27, wherein the olefin polymer is an ethylene/1-hexene copolymer.

Embodiment 29. An article comprising the olefin polymer defined in any one of embodiments 1-28.

Embodiment 30. An article comprising the olefin polymer defined in any one of embodiments 1-28, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

Embodiment 31. A film comprising the olefin polymer defined in any one of embodiments 1-28.

Embodiment 32. A blown film comprising an olefin polymer having a melt index less than or equal to about 0.4 g/10 min, wherein the film has a dart impact strength greater than or equal to about 300 g/mil.

Embodiment 33. The film defined in embodiment 32, wherein the film has a dart impact strength in any range disclosed herein, e.g., in a range from about 300 to about 2000, about 400 to about 2000, about 500 to about 2000, about 600 to about 2000, about 700 to about 2000 g/mil, etc.

Embodiments 34. The film defined in embodiment 32 or 33, wherein the film has a haze (without additives) in any range disclosed herein, e.g., greater than or equal to about 55, greater than or equal to about 65, greater than or equal to about 75, greater than or equal to about 80%, greater than or equal to about 85%, etc.

Embodiment 35. The film defined in any one of embodiments 32-34, wherein the film has a MD shrink at 250° F. in any range disclosed herein, e.g., in a range from about 20 to about 70, from about 35 to about 70, from about 25 to about 65, from about 27 to about 65%, from about 30 to about 60%, etc.

Embodiment 36. The film defined in any one of embodiments 32-35, wherein the film has a MD Elmendorf tear strength in any range disclosed herein, e.g., in a range from about 10 to about 150, from about 25 to about 150, from about 50 to about 150, from about 75 to about 150 g/mil, etc.

Embodiment 37. The film defined in any one of embodiments 32-36, wherein the film has a kinetic COF (without additives) in any range disclosed herein, e.g., in a range from about 0.3 to about 0.5, from about 0.3 to about 0.48, from about 0.32 to about 0.47, etc.

Embodiment 38. The film defined in any one of embodiments 32-37, wherein the film comprises the olefin polymer defined in any one of embodiments 1-28, e.g., the olefin polymer characterized by one or more of the MI (e.g., less than or equal to about 0.4, about 0.3, about 0.25, about 0.2 g/10 min, etc.), HLMI (e.g., from about 3 to about 60, about 4 to about 30, about 4 to about 25, about 4 to about 20, about 5 to about 18, about 5 to about 15 g/10 min, etc.), density (e.g., from about 0.91 to about 0.94, about 0.915 to about 0.935, about 0.913 to about 0.93, about 0.917 to about 0.928, about 0.92 to about 0.928 g/cm³, etc.), Mw/Mn (e.g., from about 6 to about 50, about 8 to about 35, about 10 to about 35, about 12 to about 50, about 14 to about 35, about 6 to about 20, about 8 to about 16, etc.), etc., ranges disclosed herein.

Embodiment 39. A catalyst composition comprising catalyst component I, catalyst component II, an activator, and an optional co-catalyst, wherein catalyst component I produces a lower molecular weight component having more long chain branches and less short chain branches than the higher molecular weight component (e.g., a two carbon bridged metallocene compound containing two indenyl groups, an unbridged zirconium based metallocene compound with two cyclopentadienyl groups, etc.), and catalyst component II produces a higher molecular weight component having more short chain branches and less long chain branches than the lower molecular weight component (e.g., a single atom bridged metallocene compound containing a fluorenyl group).

Embodiment 40. The composition defined in embodiment 39, wherein the catalyst composition contains only two metallocene compounds: one is a two carbon bridged metallocene compound containing two cyclopentadienyl groups, two indenyl groups, or a cyclopentadienyl and an indenyl group; and the other is a single atom bridged metallocene compound containing a fluorenyl group.

Embodiment 41. The composition defined in embodiment 39 or 40, wherein the weight percentage of catalyst component I and catalyst component II is in any range of weight percentages disclosed herein, e.g., the weight percentage of catalyst component I is in a range from about 25 to about 98%, from about 40 to about 95%, from about 55 to about 98%, from about 60 to about 95%, etc., wherein the weight percentages are based on the total weight of catalyst components I and II.

Embodiment 42. The composition defined in any one of embodiments 39-41, wherein the activator comprises any activator disclosed herein.

Embodiment 43. The composition defined in any one of embodiments 39-42, wherein the activator comprises an aluminoxane compound, an organoboron or organoborate compound, an ionizing ionic compound, or any combination thereof.

Embodiment 44. The composition defined in any one of embodiments 39-43, wherein the activator comprises an aluminoxane compound.

Embodiment 45. The composition defined in any one of embodiments 39-43, wherein the activator comprises an organoboron or organoborate compound.

Embodiment 46. The composition defined in any one of embodiments 39-43, wherein the activator comprises an ionizing ionic compound.

Embodiment 47. The composition defined in any one of embodiments 39-42, wherein the activator comprises an activator-support, the activator-support comprising any solid oxide treated with any electron-withdrawing anion disclosed herein.

Embodiment 48. The composition defined in embodiment 47, wherein the solid oxide comprises any solid oxide disclosed herein, e.g., silica, alumina, silica-alumina, silica-coated alumina, aluminum phosphate, aluminophosphate, heteropolytungstate, titania, zirconia, magnesia, boria, zinc oxide, etc., a mixed oxide thereof, or any mixture thereof; and the electron-withdrawing anion comprises any electron-withdrawing anion disclosed herein, e.g., sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, etc., or any combination thereof.

Embodiment 49. The composition defined in embodiment 47, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 50. The composition defined in embodiment 47, wherein the activator-support comprises fluorided alumina, sulfated alumina, fluorided silica-alumina, sulfated silica-alumina, fluorided silica-coated alumina, sulfated silica-coated alumina, or any combination thereof.

Embodiment 51. The composition defined in embodiment 47, wherein the activator-support comprises a fluorided solid oxide, a sulfated solid oxide, or any combination thereof.

Embodiment 52. The composition defined in embodiment 47, wherein the activator-support further comprises any metal or metal ion disclosed herein, e.g., zinc, nickel, vanadium, titanium, silver, copper, gallium, tin, tungsten, molybdenum, zirconium, or any combination thereof.

Embodiment 53. The composition defined in any one of embodiments 39-52, wherein the catalyst composition comprises a co-catalyst, e.g., any co-catalyst disclosed herein.

Embodiment 54. The composition defined in any one of embodiments 39-53, wherein the co-catalyst comprises an organoaluminum compound, an organozinc compound, an organomagnesium compound, an organolithium compound, or any combination thereof.

Embodiment 55. The composition defined in any one of embodiments 39-54, wherein the co-catalyst comprises an organoaluminum compound.

Embodiment 56. The composition defined in embodiment 55, wherein the organoaluminum compound comprises any organoaluminum compound disclosed herein, e.g., trimethylaluminum, triethylaluminum, triisobutylaluminum, etc., or combinations thereof.

Embodiment 57. The composition defined in any one of embodiments 39-42, wherein the catalyst composition comprises catalyst component I, catalyst component II, a solid oxide treated with an electron-withdrawing anion, and an organoaluminum compound.

Embodiment 58. The composition defined in any one of embodiments 47-57, wherein the catalyst composition is substantially free of aluminoxane compounds, organoboron or organoborate compounds, ionizing ionic compounds, or combinations thereof.

Embodiment 59. The composition defined in any one of embodiments 47-57, wherein the co-catalyst comprises an aluminoxane compound, an organoboron or organoborate compound, an ionizing ionic compound, an organoaluminum compound, an organozinc compound, an organomagnesium compound, an organolithium compound, or any combination thereof.

Embodiment 60. The composition defined in any one of embodiments 39-59, wherein catalyst component I comprises any catalyst component I metallocene compound disclosed herein, e.g., a two carbon bridged, zirconium based metallocene compound containing two cyclopentadienyl groups, two indenyl groups, or a cyclopentadienyl and an indenyl group; an unbridged zirconium based metallocene compound with two cyclopentadienyl groups; a single atom bridged (C or Si), zirconium based metallocene compound with two cyclopentadienyl groups (e.g., with an alkyl substituent, such as propyl); a single atom bridged (C or Si), zirconium based metallocene compound with two indenyl groups (e.g., meso-bridged); a 3-5 carbon atom bridged, zirconium based metallocene compound with two indenyl groups (e.g., rac-bridged), etc.

Embodiment 61. The composition defined in any one of embodiments 39-59, wherein catalyst component I comprises a two carbon bridged, zirconium based metallocene compound containing two indenyl groups.

Embodiment 62. The composition defined in any one of embodiments 39-59, wherein catalyst component I comprises any two carbon bridged metallocene compound disclosed herein, e.g., having formula (A):

(A)

wherein:

M¹ is Zr or Hf; Cp¹ and Cp² independently are a cyclopentadienyl or indenyl group; E¹ is a bridging group having the formula —$CR^{1A}R^{1B}$—$CR^{2A}R^{2B}$—, wherein $R^{1A}$, $R^{1B}$, $R^{2A}$, and $R^{2B}$ independently are H or a hydrocarbyl group having up to 10 carbon atoms (e.g., any $C_1$-$C_{10}$ hydrocarbyl group disclosed herein); and each X independently is a monoanionic ligand.

Embodiment 63. The composition defined in embodiment 62, wherein M¹ is Zr.

Embodiment 64. The composition defined in any one of embodiments 62-63, wherein Cp¹ and Cp² independently are a substituted indenyl or cyclopentadienyl group with any number of substituents disclosed herein, e.g., one substituent, two substituents, etc.

Embodiment 65. The composition defined in embodiment 64, wherein each substituent on Cp¹ and Cp² independently is any substituent disclosed herein, e.g., H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; H or a hydrocarbyl group having up to 18 carbon atoms, etc.

Embodiment 66. The composition defined in embodiment 62 or 63, wherein Cp¹ and Cp² contain no additional substituents, e.g., other than the bridging group.

Embodiment 67. The composition defined in embodiment 62 or 63, wherein Cp¹ and Cp² are indenyl groups containing no additional substituents, e.g., other than the bridging group.

Embodiment 68. The composition defined in any one of embodiments 62-67, wherein E¹ is a bridging group having the formula —$CH_2$—$CH_2$—.

Embodiment 69. The composition defined in any one of embodiments 39-68, wherein catalyst component II comprises a single atom bridged, zirconium or hafnium based metallocene compound containing a cyclopentadienyl and a fluorenyl group.

Embodiment 70. The composition defined in embodiment 69, wherein the single atom is a carbon or silicon atom.

Embodiment 71. The composition defined in any one of embodiments 69-70, wherein the bridging group contains an aryl substituent (e.g., phenyl).

Embodiment 72. The composition defined in any one of embodiments 69-71, wherein the bridging group contains an alkenyl substituent (e.g., a terminal alkenyl).

Embodiment 73. The composition defined in any one of embodiments 39-68, wherein catalyst component II comprises any single atom bridged metallocene compound with a fluorenyl group disclosed herein, e.g., having formula (B):

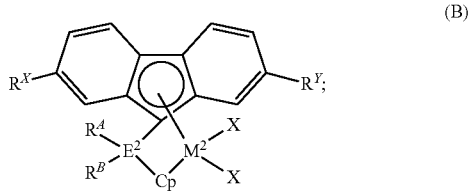

(B)

wherein:

M² is Zr or Hf; Cp is a cyclopentadienyl group; E² is carbon or silicon; $R^A$ and $R^B$ independently are H or a $C_1$ to $C_{18}$ hydrocarbyl group; $R^X$ and $R^Y$ independently are H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; and each X independently is a monoanionic ligand.

Embodiment 74. The composition defined in embodiment 73, wherein M² is Zr.

Embodiment 75. The composition defined in embodiment 73 or 74, wherein Cp is a substituted cyclopentadienyl group with any number of substituents disclosed herein, e.g., one substituent, two substituents, etc., in addition to the bridging group.

Embodiment 76. The composition defined in embodiment 75, wherein each substituent on Cp independently is any substituent disclosed herein, e.g., H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; H or a hydrocarbyl group having up to 18 carbon atoms, etc.

Embodiment 77. The composition defined in embodiment 73 or 74, wherein Cp contains no additional substituents, e.g., other than the bridging group.

Embodiment 78. The composition defined in any one of embodiments 73-77, wherein E² is carbon.

Embodiment 79. The composition defined in any one of embodiments 73-78, wherein $R^A$ and $R^B$ independently are a $C_1$ to $C_8$ alkyl group, a $C_3$ to $C_8$ alkenyl group, or a phenyl group.

Embodiment 80. The composition defined in any one of embodiments 73-79, wherein at least one of $R^A$ and $R^B$ is a phenyl group.

Embodiment 81. The composition defined in any one of embodiments 73-80, wherein at least one of $R^A$ and $R^B$ is a $C_3$ to $C_8$ terminal alkenyl group.

Embodiment 82. The composition defined in any one of embodiments 73-78, wherein $R^A$ and $R^B$ independently are a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a cyclohexylphenyl group, a naphthyl group, a tolyl group, or a benzyl group.

Embodiment 83. The composition defined in any one of embodiments 73-82, wherein $R^X$ and $R^Y$ independently are H or any $C_1$ to $C_{12}$ hydrocarbyl group disclosed herein.

Embodiment 84. The composition defined in any one of embodiments 73-82, wherein $R^X$ and $R^Y$ independently are H, a methyl group, an ethyl group, a propyl group, a butyl group, a pentyl group, a hexyl group, a heptyl group, an octyl group, a nonyl group, a decyl group, an ethenyl group, a propenyl group, a butenyl group, a pentenyl group, a hexenyl group, a heptenyl group, an octenyl group, a nonenyl group, a decenyl group, a phenyl group, a tolyl group, or a benzyl group.

Embodiment 85. The composition defined in any one of embodiments 73-82, wherein $R^X$ and $R^Y$ independently are H or a $C_1$ to $C_6$ linear or branched alkyl group (e.g., tert-butyl).

Embodiment 86. The composition defined in any one of embodiments 62-68 and 73-85, wherein each X independently is any monoanionic ligand disclosed herein.

Embodiment 87. The composition defined in any one of embodiments 62-68 and 73-85, wherein each X independently is H, $BH_4$, a halide, a $C_1$ to $C_{36}$ hydrocarbyl group, a $C_1$ to $C36$ hydrocarboxy group, a $C_1$ to $C_{36}$ hydrocarbylaminyl group, a $C_1$ to $C_{36}$ hydrocarbylsilyl group, a $C_1$ to $C_{36}$ hydrocarbylaminylsilyl group, $OBR_2^1$, or $OSO_2R^1$, wherein $R^1$ is a $C_1$ to $C_{36}$ hydrocarbyl group.

Embodiment 88. The composition defined in any one of embodiments 62-68 and 73-85, wherein each X independently is any halide or $C_1$ to $C_{18}$ hydrocarbyl group disclosed herein.

Embodiment 89. The composition defined in any one of embodiments 62-68 and 73-85, wherein each X is Cl.

Embodiment 90. The composition defined in any one of embodiments 39-89, wherein the catalyst composition is produced by a process comprising contacting, in any order, catalyst component I, catalyst component II, and the activator.

Embodiment 91. The composition defined in any one of embodiments 39-89, wherein the catalyst composition is produced by a process comprising contacting, in any order, catalyst component I, catalyst component II, the activator, and the co-catalyst.

Embodiment 92. The composition defined in any one of embodiments 39-91, wherein a catalyst activity of the catalyst composition is in any range disclosed herein, e.g., in a range from about 150 to about 10,000, from about 500 to about 7,500, from about 1,000 to about 5,000 grams, etc., of ethylene polymer per gram of activator-support per hour, under slurry polymerization conditions, with a triisobutylaluminum co-catalyst, using isobutane as a diluent, and with a polymerization temperature of 90° C. and a reactor pressure of 390 psig.

Embodiment 93. An olefin polymerization process, the process comprising contacting the catalyst composition defined in any one of embodiments 39-92 with an olefin monomer and an optional olefin comonomer in a polymerization reactor system under polymerization conditions to produce an olefin polymer.

Embodiment 94. The process defined in embodiment 93, wherein the olefin monomer comprises any olefin monomer disclosed herein, e.g., any $C_2$-$C_{20}$ olefin.

Embodiment 95. The process defined in embodiment 93 or 94, wherein the olefin monomer and the optional olefin comonomer independently comprise a $C_2$-$C_{20}$ alpha-olefin.

Embodiment 96. The process defined in any one of embodiments 93-95, wherein the olefin monomer comprises ethylene.

Embodiment 97. The process defined in any one of embodiments 93-96, wherein the catalyst composition is contacted with ethylene and an olefin comonomer comprising a $C_3$-$C_{10}$ alpha-olefin.

Embodiment 98. The process defined in any one of embodiments 93-97, wherein the catalyst composition is contacted with ethylene and an olefin comonomer comprising 1-butene, 1-hexene, 1-octene, or a mixture thereof.

Embodiment 99. The process defined in any one of embodiments 93-95, wherein the olefin monomer comprises propylene.

Embodiment 100. The process defined in any one of embodiments 93-99, wherein the polymerization reactor system comprises a batch reactor, a slurry reactor, a gas-phase reactor, a solution reactor, a high pressure reactor, a tubular reactor, an autoclave reactor, or a combination thereof.

Embodiment 101. The process defined in any one of embodiments 93-100, wherein the polymerization reactor system comprises a slurry reactor, a gas-phase reactor, a solution reactor, or a combination thereof.

Embodiment 102. The process defined in any one of embodiments 93-101, wherein the polymerization reactor system comprises a loop slurry reactor.

Embodiment 103. The process defined in any one of embodiments 93-102, wherein the polymerization reactor system comprises a single reactor.

Embodiment 104. The process defined in any one of embodiments 93-102, wherein the polymerization reactor system comprises 2 reactors.

Embodiment 105. The process defined in any one of embodiments 93-102, wherein the polymerization reactor system comprises more than 2 reactors.

Embodiment 106. The process defined in any one of embodiments 93-105, wherein the olefin polymer comprises any olefin polymer disclosed herein.

Embodiment 107. The process defined in any one of embodiments 93-98 and 100-106, wherein the olefin polymer is an ethylene homopolymer, an ethylene/1-butene copolymer, an ethylene/1-hexene copolymer, or an ethylene/1-octene copolymer.

Embodiment 108. The process defined in any one of embodiments 93-98 and 100-107, wherein the olefin polymer is an ethylene/1-hexene copolymer.

Embodiment 109. The process defined in any one of embodiments 93-95 and 99-106, wherein the olefin polymer is a polypropylene homopolymer or a propylene based copolymer.

Embodiment 110. The process defined in any one of embodiments 93-109, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 111. The process defined in any one of embodiments 93-110, wherein the polymerization conditions are substantially constant, e.g., for a particular polymer grade.

Embodiment 112. The process defined in any one of embodiments 93-111, wherein no hydrogen is added to the polymerization reactor system.

Embodiment 113. The process defined in any one of embodiments 93-111, wherein hydrogen is added to the polymerization reactor system.

Embodiment 114. An olefin polymer produced by the olefin polymerization process defined in any one of embodiments 93-113.

Embodiment 115. An olefin polymer defined in any one of embodiments 1-28 produced by the olefin polymerization process of any one of embodiments 93-113.

Embodiment 116. An article comprising the olefin polymer defined in any one of embodiments 114-115.

Embodiment 117. A method or forming or preparing an article of manufacture comprising an olefin polymer, the method comprising (i) performing the olefin polymerization process defined in any one of embodiments 93-113 to produce an olefin polymer (e.g., the olefin polymer of any one of embodiments 1-28), and (ii) forming the article of manufacture comprising the olefin polymer, e.g., via any technique disclosed herein.

Embodiment 118. The article defined in any one of embodiments 116-117, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

Embodiment 119. The article defined in any one of embodiments 116-117, wherein the article is a film (e.g., a blown film) defined in any one of embodiments 32-38.

We claim:

1. An olefin polymerization process, the process comprising contacting a catalyst composition with an olefin monomer and an optional olefin comonomer in a polymerization reactor system under polymerization conditions to produce an olefin polymer comprising a higher molecular weight component and a lower molecular weight component, wherein:
the olefin polymer is characterized by a ratio of the Mp of the higher molecular weight component to the Mp of the lower molecular weight component in a range from about 5:1 to about 100:1;
the catalyst composition comprises:
catalyst component I comprising a two carbon bridged metallocene compound containing two cyclopentadienyl groups, two indenyl groups, or a cyclopentadienyl and indenyl group;
catalyst component II comprising a single atom bridged metallocene compound containing a fluorenyl group;
an activator; and
optionally, a co-catalyst; and
a weight percentage of catalyst component I is in a range from about 25 to about 98%, based on the total weight of catalyst component I and catalyst component II.

2. The process of claim 1, wherein:
the activator comprises an activator-support comprising a fluorided solid oxide and/or a sulfated solid oxide;
the catalyst composition comprises an organoaluminum co-catalyst;
the catalyst composition is contacted with ethylene and an olefin comonomer comprising 1-butene, 1-hexene, 1-octene, or a mixture thereof; and
the polymerization reactor system comprises a slurry reactor, gas-phase reactor, solution reactor, or a combination thereof.

3. The process of claim 1, wherein:
the activator comprises an activator-support comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof; and
the co-catalyst comprises an organoaluminum compound comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or combinations thereof.

4. The process of claim 1, wherein:
catalyst component I comprises a two carbon bridged, zirconium based metallocene compound containing two cyclopentadienyl groups, two indenyl groups, or a cyclopentadienyl and indenyl group; and
catalyst component II comprises a single atom bridged, zirconium or hafnium based metallocene compound containing a cyclopentadienyl and fluorenyl group.

5. The process of claim 4, wherein the activator comprises an aluminoxane compound, an organoboron or organoborate compound, an ionizing ionic compound, or any combination thereof.

6. The process of claim 4, wherein:
the activator comprises an activator-support comprising a fluorided solid oxide and/or a sulfated solid oxide; and
the catalyst composition comprises an organoaluminum co-catalyst.

7. The process of claim 4, wherein:
the catalyst composition is contacted with ethylene and an olefin comonomer comprising 1-butene, 1-hexene, 1-octene, or a mixture thereof; and
the polymerization reactor system comprises a slurry reactor, gas-phase reactor, solution reactor, or a combination thereof.

8. The process of claim 1, wherein:
catalyst component I comprises a two carbon bridged, zirconium based metallocene compound containing two unsubstituted indenyl groups; and
catalyst component II comprises a carbon or silicon atom bridged, zirconium or hafnium based metallocene compound containing a cyclopentadienyl group and a fluorenyl group, wherein at least one substituent on the carbon or silicon bridging atom is an alkenyl group or an aryl group.

9. The process of claim 8, wherein:
the activator comprises an activator-support comprising a fluorided solid oxide and/or a sulfated solid oxide;
the catalyst composition comprises an organoaluminum co-catalyst;
the catalyst composition is contacted with ethylene and an olefin comonomer comprising 1-butene, 1-hexene, 1-octene, or a mixture thereof; and
the polymerization reactor system comprises a slurry reactor, gas-phase reactor, solution reactor, or a combination thereof.

10. The process of claim 8, wherein:
the activator comprises an aluminoxane compound, an organoboron or organoborate compound, an ionizing ionic compound, or any combination thereof;
the catalyst composition is contacted with ethylene and an olefin comonomer comprising 1-butene, 1-hexene, 1-octene, or a mixture thereof; and
the polymerization reactor system comprises a slurry reactor, gas-phase reactor, solution reactor, or a combination thereof.

11. The process of claim 8, wherein the weight percentage of catalyst component I is in a range from about 60 to about 95%, based on the total weight of catalyst component I and catalyst component II.

12. The process of claim 1, wherein:
catalyst component I comprises a metallocene compound having formula (A):

(A)

wherein:
$M^1$ is Zr or Hf;
$Cp^1$ and $Cp^2$ independently are a substituted or unsubstituted cyclopentadienyl or indenyl group;
$E^1$ is a bridging group having the formula $-CR^{1A}R^{1B}-CR^{2A}R^{2B}-$, wherein $R^{1A}$, $R^{1B}$, $R^{2A}$, and $R^{2B}$ independently are H or a hydrocarbyl group having up to 10 carbon atoms; and each X independently is a monoanionic ligand; and catalyst component II comprises a metallocene compound having formula (B):

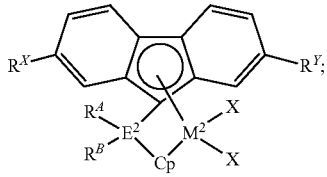
(B)

wherein:

$M^2$ is Zr or Hf;

Cp is a substituted or unsubstituted cyclopentadienyl group;

$E^2$ is carbon or silicon;

$R^A$ and $R^B$ independently are H or a $C_1$ to $C_{18}$ hydrocarbyl group;

$R^X$ and $R^Y$ independently are H, a halide, a $C_1$ to $C_{36}$ hydrocarbyl group, a $C_1$ to $C_{36}$ halogenated hydrocarbyl group, a $C_1$ to $C_{36}$ hydrocarboxy group, or a $C_1$ to $C_{36}$ hydrocarbylsilyl group; and each X independently is a monoanionic ligand.

13. The process of claim 12, wherein:

$M^1$ is Zr;

$E^1$ is a bridging group having the formula $-CH_2-CH_2-$;

Cp is a mono-substituted or unsubstituted cyclopentadienyl group;

$R^A$ and $R^B$ independently are a $C_1$ to $C_8$ alkyl group, a $C_3$ to $C_8$ alkenyl group, or a phenyl group; and $R^X$ and $R^Y$ independently are H or a $C_1$ to $C_6$ linear or branched alkyl group.

14. The process of claim 13, wherein:

at least one of $Cp^1$ and $Cp^2$ is an unsubstituted indenyl group;

$M^2$ is Zr;

$E^2$ is carbon; and each X is Cl.

15. The process of claim 1, wherein catalyst component I comprises:

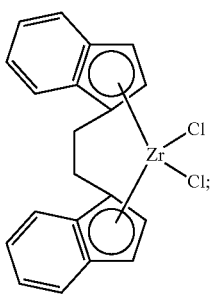

and catalyst component II comprises:

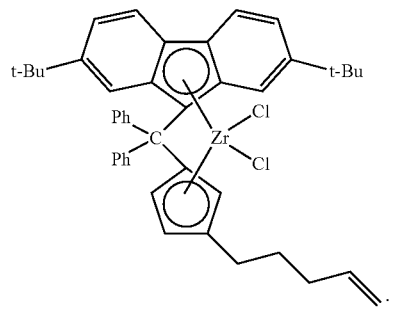

16. The process of claim 1, wherein the olefin polymer comprises an ethylene homopolymer, an ethylene/1-butene copolymer, an ethylene/1-hexene copolymer, an ethylene/1- copolymer, or a combination thereof.

17. The process of claim 16, wherein catalyst composition I produces the lower molecular weight component, and catalyst composition II produces the higher molecular weight component.

18. An olefin polymerization process, the process comprising contacting a catalyst composition with ethylene and an optional $C_3$—$C_{10}$ alpha-olefin comonomer in a polymerization reactor system under polymerization conditions to produce an ethylene polymer comprising a higher molecular weight component and a lower molecular weight component, wherein:

the ethylene polymer is characterized by:
  a ratio of the Mp of the higher molecular weight component to the Mp of the lower molecular weight component in a range from about 5:1 to about 100:1;
  a number of long chain branches (LCB) of the lower molecular weight component in a range from about 5 to about 50 LCB per million total carbon atoms; and
  a number of LCB of the higher molecular weight component less than or equal to about 5 LCB per million total carbon atoms;

the catalyst composition comprises:
  catalyst component I comprising a two carbon bridged metallocene compound containing two cyclopentadienyl groups, two indenyl groups, or a cyclopentadienyl and indenyl group;
  catalyst component II comprising a single atom bridged metallocene compound containing a fluorenyl group;
  an activator; and
  optionally, a co-catalyst; and a weight percentage of catalyst component I is in a range from about 25 to about 98%, based on the total weight of catalyst component I and catalyst component II.

19. The process of claim 18, wherein:

the weight percentage of catalyst component I is in a range from about 60 to about 95%, based on the total weight of catalyst component I and catalyst component II;

the catalyst composition is contacted with ethylene and a comonomer comprising 1-butene, 1-hexene, 1-octene, or a mixture thereof; and the polymerization reactor system comprises a slurry reactor, gas-phase reactor, solution reactor, or a combination thereof.

20. The process of claim 19, wherein the activator comprises an aluminoxane compound, an organoboron or organoborate compound, an ionizing ionic compound, or any combination thereof.

21. The process of claim 19, wherein:
the activator comprises an activator-support comprising a fluorided solid oxide and/or a sulfated solid oxide; and
the catalyst composition comprises an organoaluminum co-catalyst.

* * * * *